(12) United States Patent
Yamamoto

(10) Patent No.: US 6,732,849 B2
(45) Date of Patent: May 11, 2004

(54) SORTING SYSTEM

(75) Inventor: Tatsuya Yamamoto, Shiga (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 10/256,392

(22) Filed: Sep. 27, 2002

(65) Prior Publication Data

US 2003/0079958 A1 May 1, 2003

(30) Foreign Application Priority Data

Oct. 11, 2001 (JP) ......................................... 2001-313351
Nov. 22, 2001 (JP) ......................................... 2001-356792

(51) Int. Cl.[7] ............................................. B65G 47/10
(52) U.S. Cl. ............................. 198/370.05; 198/370.03
(58) Field of Search ........................ 198/370.01, 370.03, 198/370, 370.05, 370.06

(56) References Cited

U.S. PATENT DOCUMENTS 3,618,745 A * 11/1971 Dominici ............ 198/370.06 X
4,763,771 A * 8/1988 Geerts ................... 198/370.06
4,781,281 A   11/1988 Canziani .................... 198/365
5,387,260 A    2/1995 Gennari et al. ............. 198/798
5,813,515 A    9/1998 Gennari et al. ............. 198/370

FOREIGN PATENT DOCUMENTS

| DE | 2 007 439 | 2/1970 | ..................... 17/6 |
| EP | 0 611 713 | 8/1994 | ..................... 47/96 |
| EP | 0 752 280 | 5/1996 | ....................... 3/6 |
| JP | 1-90712   | 7/2000 | |
| JP | 1-90713   | 7/2000 | |

* cited by examiner

Primary Examiner—James R. Bidwell
(74) Attorney, Agent, or Firm—Kusner & Jaffe

(57) ABSTRACT

A sorting conveyor is composed of a plurality of front wheels and rear wheels each extending in a transverse direction, and a plurality of endless turning bodies wound between the wheels, respectively, each pair of wheels being arranged opposite each other in a longitudinal direction. A receipt section is provided with turning force applying units for turning target endless turning bodies of a target sorting conveyor. This configuration allows one sorting conveyor to handle a plurality of sorted articles and provides a sorting system which is constituted simply and inexpensively on the whole.

13 Claims, 23 Drawing Sheets

SORTING SYSTEM

FIELD OF THE INVENTION

The present invention relates to a sorting system employed, for example, to sort many types of books according to distributors.

BACKGROUND OF THE INVENTION

A conventional sorting system of this type has hitherto been provided according to, for example, Japanese Patent Unexamined Publication No. 8-301438. In this conventional configuration, each running cart that can arbitrarily run on a given running path has a pair of sorting belt conveyors (sorting conveying apparatuses) arranged in the front or rear thereof, respectively, to sort and feed loads in a lateral direction relative to a running direction. The given running path has a loading section formed at a predetermined location to load loads from a stacking section onto the sorting belt conveyors of the running cart. Furthermore, the given running path has a sorting section formed at each of a right and left sides thereof.

With this conventional configuration, while a group of running carts are running on the given running path, the loading section loads a load between the sorting belt conveyors arranged in the front and rear, respectively, of an empty running cart. Then, when the loaded running cart reaches the target sorting section, the sorting belt conveyors, to which power is fed in a non-contact manner, are driven forward or backward. Thus, the load is fed to the target sorting section.

However, according to the above described conventional configuration, each running cart is provided with driving means (control means) for the sorting belt conveyors. This driving means needs to be powered and competes with other apparatuses for signals. Consequently, the entire structure becomes complicated and expensive and requires frequent and strict maintenance.

Further, only one load can be load between the front and rear sorting belt conveyors, resulting in inefficient sorting. If for example, a load is loaded on each of the front and rear sorting belt conveyors, one running cart can handle two loads. However, in this case, driving means is required which individually drives the front and rear sorting bent conveyors. As a result, the entire-structure becomes more complicated and expensive.

Furthermore, the position of a load as transferred from the loading section to between the sorting belt conveyors varies, i.e. the position of the load as supported on the sorting belt conveyors varies. Accordingly, when the sorting belt conveyors are driven to feed the load to the sorting section, the direction of the load is not fixed. Furthermore, loads leave the belts in a varying direction. As a result, it has been difficult to suitably feed loads to the sorting section. In particular, if the loads are books, which are stacked together in the sorting sections, then the books cannot be stacked together in order.

Further, the belts of the sorting belt conveyors are easily damaged by the impact of receipt of a loaded load or because of the frequency of sorting operations. Accordingly, the belts must be frequently replaced with new ones. In this case, since it was difficult to introduce a takeup mechanism into the running cart, the sorting belt conveyors have hitherto been partially disassembled so as to replace the belts with new ones. However, this belt replacement required very much time, and the sorting line had to be stopped. Accordingly, in a round-the-clock system or the like which cannot shut down the sorting line, the time available for belt replacement was limited. Therefore, the belts could not be easily replaced with new ones.

SUMMARY OF THE INVENTION

It is thus a first object of the present invention to provide a sorting system that can be simply and inexpensively constructed as a whole, while allowing a single sorting conveyor to handle a plurality of sorted articles.

It is a second object of the present invention to provide a sorting system that allows belts to be promptly and easily replaced with new ones.

To attain the first object, a first aspect of the present invention provides a sorting system comprising an endless driving body provided with a plurality of sorting conveyors to form an endless conveying path, and a group of receipt sections arranged opposite the conveying path to receive sorted articles from the sorting conveyors, the sorting system being characterized in that each of the sorting conveyors has a plurality of front and rear wheels each extending in a transverse direction, and a plurality of endless turning bodies wound around the wheels arranged opposite each other in a longitudinal direction, the turning bodies being capable of individually turning along the conveying path, and each of the receipt section is provided with turning force applying units for turning the target endless turning bodies of the target sorting conveyor.

According to the configuration of the first aspect of the present invention, the group of sorting conveyors are moved above the group of receipt sections, and before or after the sorting conveyor reaches the target receipt section, the one or more turning force applying means corresponding to this receipt section are operated. Thus, the one or more endless turning bodies can be turned along the conveying path to allow the one or more sorted articles supported on the endless turning bodies to be fed and loaded into the target receipt section. Then, once all the sorted articles have been fed by turning the endless turning bodies, the operation of the turning means can be stopped.

Accordingly, while one sorting conveyor can handle a plurality of sorted articles, each conveyor needs not be provided with any driving means (control means). This eliminates the need to power the driving means and the need for the driving means to compete with other apparatuses for signals. Therefore, the system as a whole can be simply and inexpensively constructed, and the need for frequent and strict maintenance is eliminated.

Further, a sorting system according to a second aspect of the present invention is characterized in that the sorting conveyor is provided with passive wheels linked with one of the group of front wheels and the group of rear wheels, and the turning force applying units can move toward or away from the target passive wheels. And by thus moving toward, the turning force applying units engage with the target passive wheels so as to rotate these wheels by using movement force exerted along the conveying path of the sorting conveyor.

According to the second aspect of the present invention, the one or more turning force applying means are moved closer to the arriving sorting conveyor to engage the passive wheels of the arriving sorting conveyor with the turning force applying means. Accordingly, one of the groups of wheels which are linked with the passive wheels can be forcibly rotated. The forced rotation of the one group of wheels enables the endless turning bodies to be turned along the conveying path while rotating the other group of wheels idly. Therefore, the sorted articles supported on the endless turning bodies can be sent out.

A sorting system according to a third aspect of the present invention is characterized in that the sorting conveyor has a front wheel shaft extending in the transverse direction and having one of the lateral pair of front wheels connected thereto, with the other front wheel rotatably fitted over the sorting conveyor via a cylindrical shaft, and the turning force applying units are arranged to act individually on the front wheel shaft and the cylindrical shaft at one of the lateral sides of sorting conveyor.

According to the third aspect of the present invention, the one or more turning force applying means are moved closer to the arriving sorting conveyor to engage the front wheel shaft and cylindrical shaft of the arriving sorting conveyor with the turning force applying means and can then be forcibly rotated. Thus, the lateral pair of front wheels can be forcibly rotated via the front wheel shaft and the cylindrical shaft. The forced rotation of the front wheels enables the endless turning bodies to be turned along the conveying path while rotating the rear wheels idly. Therefore, the sorted articles supported on the endless turning bodies can be fed.

Furthermore, a sorting system according to a fourth aspect of the present invention is characterized in that the sorting conveyor has a lateral pair of front wheel shafts each having one of the wheels connected thereto and being provided with a passive wheel, and the turning force applying means are arranged at the right and left sides of the sorting conveyor, respectively, to act arbitrarily on the opposite passive wheels.

According to the fourth aspect of the present invention, before the sorting conveyor reaches the target receipt section, the sorted articles supported on the endless belts can be fed and loaded into the target receipt section by operating one or both of the turning force applying means corresponding to the receipt section. In this case, since the turning force applying means are arranged at the right and left sides of the sorting conveyor, respectively, it is easy to check the operation of each turning force applying means or carry out maintenance inspections.

Moreover, a sorting system according to a fifth aspect of the present invention is characterized in that the sorting conveyor has crossbars formed on the endless turning bodies and can be inclined toward the endless driving body around a horizontal axis lying at right angles to the conveying path, and the sorting conveyor is provided with guided bodies so as to receive sorted articles while the endless turning bodies lie in a horizontal direction and to reach the group of receipt sections while the endless turning bodies are inclined in such a manner that a supply side thereof on which the crossbars are located lies below the other side thereof, the sorting conveyor also being provided with guide means for restricting inclination which extend along the conveying path and along which the guided bodies are guided.

According to the fifth aspect of the present invention, the sorting conveyor can easily and reliably receive sorted articles while the endless turning bodies are extending in the horizontal direction. The guided bodies are guided along the guide means when the sorting conveyor supporting the sorted articles on the endless turning bodies moves to the group of receipt sections. Thus, the sorting conveyor can be inclined through a large angle around the horizontal axis so that the supply side of each endless turning body lies below the other side. This inclination causes the sorted articles to slide on the endless turning bodies and then abut against the crossbars, located on the supply side thereof. Consequently, the sorted article supported on the endless turning bodies in incorrect directions can have their supported positions automatically corrected.

Once the supported positions of the sorted articles have been corrected, the endless turning bodies are inclined (turned) around the horizontal axis so as to reduce the inclination to raise the supply side thereof. Then, the sorting conveyor is moved above the group of receipt sections. Subsequently, when the sorting conveyor reaches the target receipt section, the endless turning bodies are turned along the conveying path so that the higher portion thereof is lowered. Thus, the sorted article supported on the endless turning bodies can be fed and loaded into the target receipt section. In this case, the sorted articles on the endless turning bodies have their directions or the like corrected and can thus be fed in a fixed direction. Furthermore, the sorted articles can maintain the fixed direction all through the operation of leaving the endless turning bodies and can thus be suitably sorted into the receipt section.

Further, a sorting system according to a sixth aspect of the present invention is characterized in that the group of sorting conveyors are attached to a frame in a cantilever manner.

According to the sixth aspect of the present invention, the drive and support arrangements are disposed only at one side of the sorting conveyors, thereby simplifying the system and enabling easy maintenance.

A sorting system according to a seventh aspect of the present invention is characterized in that the group of sorting conveyors are attached to the frame in a center impeller manner.

According to the seventh aspect of the present invention, the group of sorting conveyors are connected to the endless driving body at one side thereof, i.e. have the driving arrangements disposed-only at one side thereof, thereby simplifying the system and enabling easy maintenance. Nevertheless, the group of sorting conveyors can be more stably moved while being supported on the frame in a center impeller manner.

Furthermore, a sorting system according to an eighth aspect of the present invention is characterized in that the group of sorting conveyors are attached to the frame in a center impeller manner, each sorting conveyor is provided with guided bodies at the right and left sides thereof, respectively, and a pair of guide means along which the respective guided bodies are guided.

According to the eighth aspect of the present invention, the group of sorting conveyors are connected to the endless driving body at one side thereof, i.e. have the driving arrangements disposed only at one side thereof, thereby simplifying the system and enabling easy maintenance. Nevertheless, the group of sorting conveyors can be more stably moved while being supported on the frame in a center impeller manner. Furthermore, the right and left guided bodies are supported and guided along the guide means. Therefore, the group of sorting conveyors can always be smoothly and stably inclined and swayed laterally synchronously without being subjected to twist or the like.

To attain the second object described previously, a ninth aspect of the present invention provides a sorting system comprising an endless driving body provided with a plurality of sorting conveyors to form an endless conveying path, and a group of receipt sections arranged opposite the conveying path to receive sorted articles from the sorting conveyors, the sorting system being characterized in that each sorting conveyor is composed of a front wheel, a rear wheel, and an endless turning bodies wound between both wheels and which can be arbitrarily turned along the conveying path, the sorting conveyor is supported and guided on a frame in a cantilever manner, and at least one of the wheels can be arbitrarily moved between a position where the endless turning bodies are stretched and a position where the endless turning bodies are loosened.

According to the ninth aspect of the present invention, the endless turning bodies of the group of sorting conveyors is turned along the conveying path to allow the sorted articles supported on the endless turning bodies to be fed and sorted in an intended manner. Further, the group of sorting conveyors are supported in a cantilever manner, so that the driving and support arrangements are disposed only at one side of the sorting conveyors, thereby simplifying the system and enabling easy maintenance. Furthermore, the endless turning bodies are moved to the position where they are stretched, so that by rotating the wheels, the endless turning bodies can be reliably turned by a predetermined amount without being subjected to a slip or the like.

Further, one of the wheels is moved to the position where the endless turning bodies are loosened, thereby enabling the endless turning bodies to be drawn out opposite to the frame. Subsequently, the endless turning bodies can be promptly replaced with new ones by externally fitting the new endless turning bodies on both wheels and moving one of the wheels to the position where the endless turning bodies are stretched. This reduces the time during which the sorting system must be shut down. Therefore, the endless turning bodies can be easily replaced with new one seven if the sorting system cannot be easily shut down because for example, it must be operated around the clock.

Further, a sorting system according to a tenth aspect of the present invention is characterized in that at least one of the wheels are rotatably supported by an swaying section provided in a conveyor frame, and the swaying section can be fixed to the conveyor frame when the wheel is at the position where the endless turning bodies are stretched.

According to the tenth aspect of the present invention, the swaying section is swayed to enable one of the wheels to be moved the position where the endless turning bodies are stretched, and this position can then be fixed. On the other hand, the swaying section is inversely swayed to enable one of the wheels to be moved to the position where the endless turning bodies are loosened. Accordingly, the structure and operation of the system can be simplified.

A sorting system according to an eleventh aspect of the present invention is characterized in that with respect to the conveyor frame, the front wheel is held in position, whereas the rear wheel is movable, and a group of receipt sections that receive sorted articles from the sorting conveyors are provided opposite the conveying path, and in that each receipt section is provided with turning force applying means for turning the endless turning bodies of the target sorting conveyor, the turning force applying means can be moved toward or away from a passive wheel provided closer to the front wheel, and the turning force applying-means are moved and engage with the passive wheel to rotate these wheels using movement force exerted along the conveying path for the sorting conveyor.

According to the eleventh aspect of the present invention, the group of sorting conveyors are moved above the group of receipt sections, and before or after the target receipt section is reached, the turning force applying means corresponding to this receipt section are operated. Then, the passive wheels of the arriving sorting conveyor are engaged with the turning force applying means to force the front wheels linked with the passive wheels to be rotated. Thus, the endless turning bodies can be turned along the conveying path, thereby enabling the sorted articles supported on the endless turning bodies to be fed and loaded into the target receipt section. Then, once all sorted articles have been fed by turning the endless turning bodies, the operation of the turning force applying means can be stopped.

Furthermore, a sorting system according to a twelfth aspect of the present invention is characterized in that each sorting conveyor has a plurality of front wheels and rear wheels each extending in a transverse direction, and a plurality of endless turning bodies wound between wheels arranged opposite each other in a longitudinal direction and which can be individually turned along the conveying path, and each receipt section is provided with turning force applying means for turning the target endless turning bodies of the target sorting conveyor.

According to the twelfth aspect of the preset invention, the one or more turning force applying means can be moved toward the arriving sorting conveyor and engaged with it to force the one or more endless turning bodies of this sorting conveyor. The forced rotation enables the endless turning bodies to be turned along the conveying path, thereby allowing the sorted article supported on the endless turning bodies to be fed. Accordingly, while one sorting conveyor can handle a plurality of sorted articles, each conveyor need not be provided with any driving means (control means). This eliminates the need to power the driving means and the need for the driving means to compete with other apparatuses for signals. Therefore, the system as a whole can be simply and inexpensively constructed, and the need for frequent and strict maintenance is eliminated.

Furthermore, a sorting system according to a thirteenth aspect of the present invention is characterized in that the sorting conveyor has crossbars formed on the endless turning bodies and can be inclined toward the endless driving body around a horizontal axis lying at right angles to the conveying path, and the sorting conveyor is provided with guided bodies so as to receive sorted articles while the endless turning bodies lie in a horizontal direction and to reach the group of receipt sections while the endless turning bodies are inclined in such a manner that a supply side thereof on which the crossbars are located lies below the other side thereof, the sorting conveyor being also provided with guide means for restricting inclination which extend along the conveying path and along which the guided bodies are guided.

According to the thirteenth aspect of the present invention, the sorting conveyor can easily and reliably receive sorted articles using the endless turning bodies, lying in the horizontal direction. The guided bodies are guided along the guide means when sorting conveyor supporting the sorted articles on the endless turning bodies moves to the group of receipt sections. Thus, the sorting conveyor can be inclined through a large angle around the horizontal axis so that the supply side of each endless turning body lies below the other side. This inclination causes the sorted articles to slide on the endless turning bodies and then abut against the crossbars, located on the supply side thereof. Consequently, the sorted article supported on the endless turning bodies in incorrect directions can have their supported positions automatically corrected.

Once the supported positions of the sorted articles thus have been corrected, the endless turning bodies are inclined (turned) around the horizontal axis so as to reduce the inclination to raise the supply side thereof. Then, the sorting conveyor is moved above the group of receipt sections. Subsequently, when the sorting conveyor reaches the target receipt section, the endless turning bodies are turned along the conveying path so that the higher portion thereof is lowered. Thus, the sorted articles supported on the endless turning bodies can be fed and loaded into the target receipt section. In this case, the sorted articles on the endless turning bodies have their directions or the like corrected and can thus be fed in a fixed direction. Furthermore, the sorted articles can maintain the fixed direction all through the operation of leaving the endless turning bodies and can thus be suitably sorted into the receipt section.

DESCRIPTION OF THE EMBODIMENTS

A first embodiment of the present invention will be described below with reference to FIGS. 1 to 10.

Figure 1:
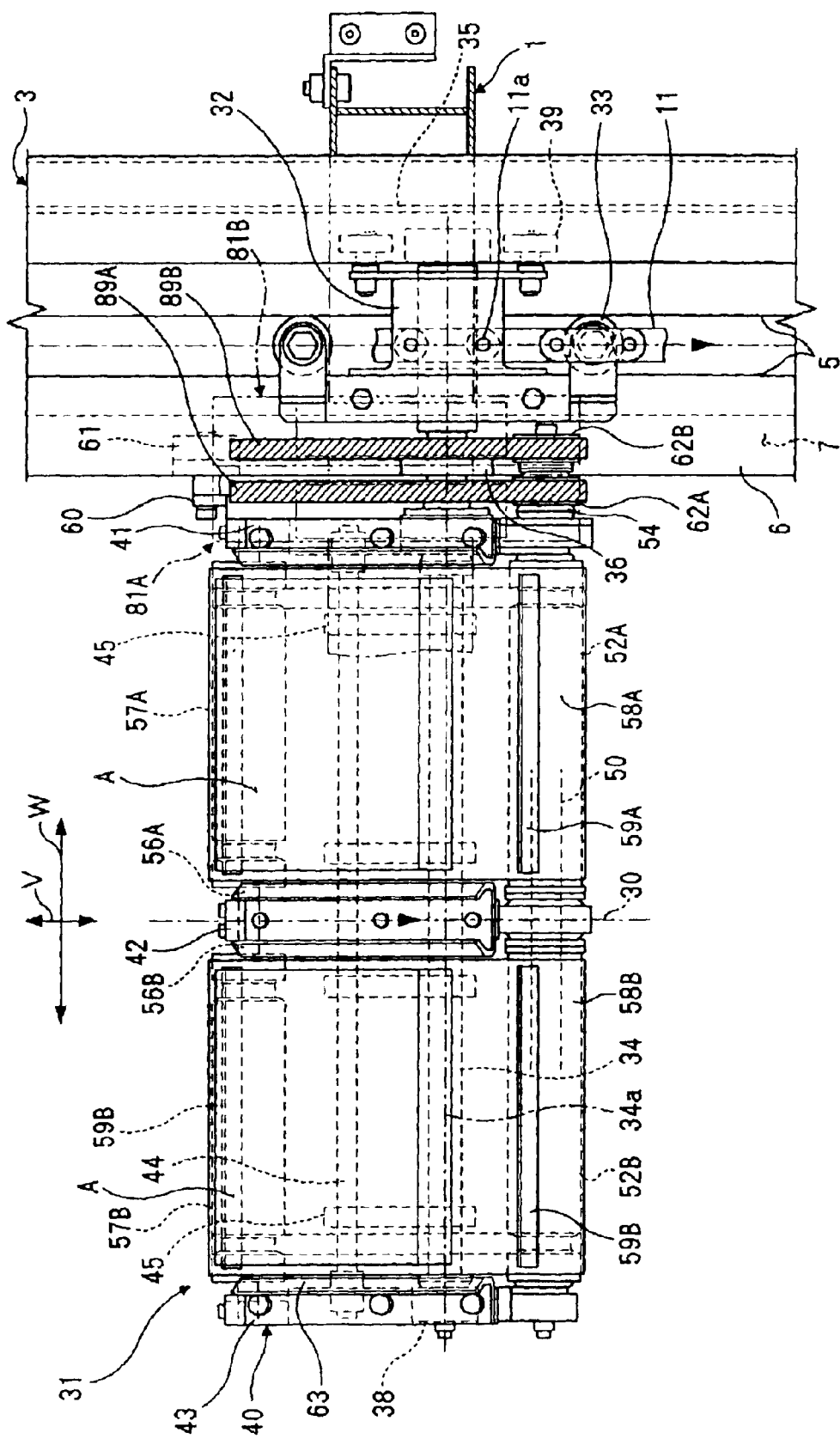
FIG. 1 is a plan view showing a first embodiment of the present invention wherein a sorting conveyor in a sorting system is inclined through a small angle.
Figure 2:
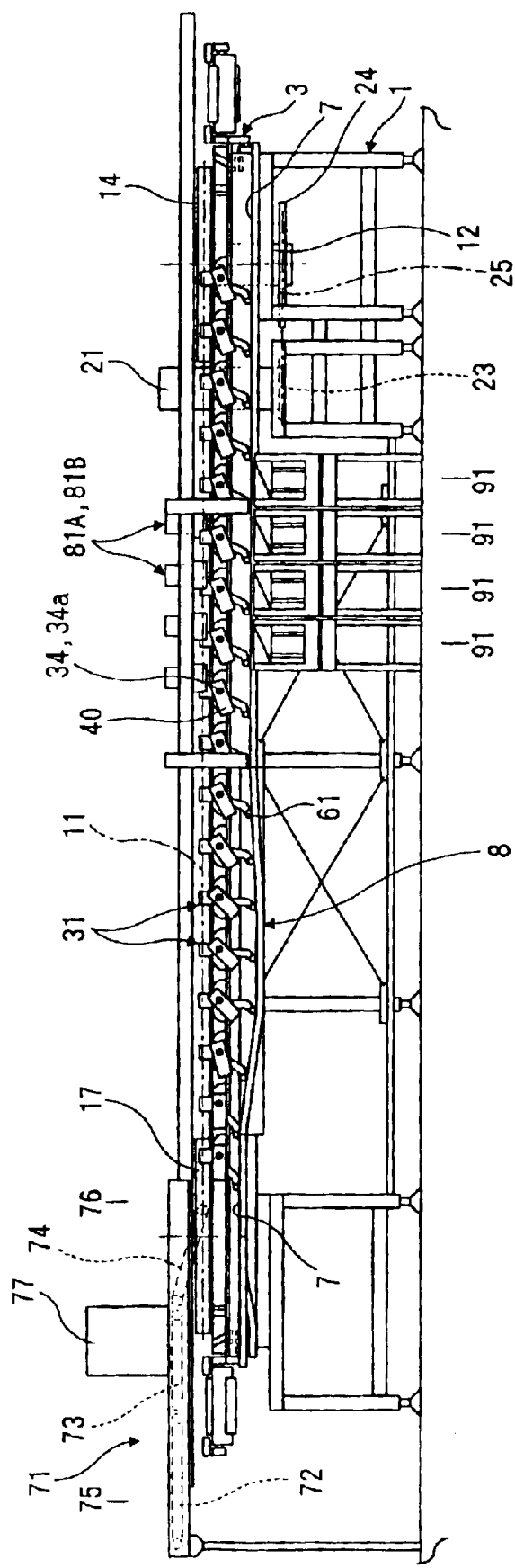
FIG. 2 is a side view of the sorting system.
Figure 3:
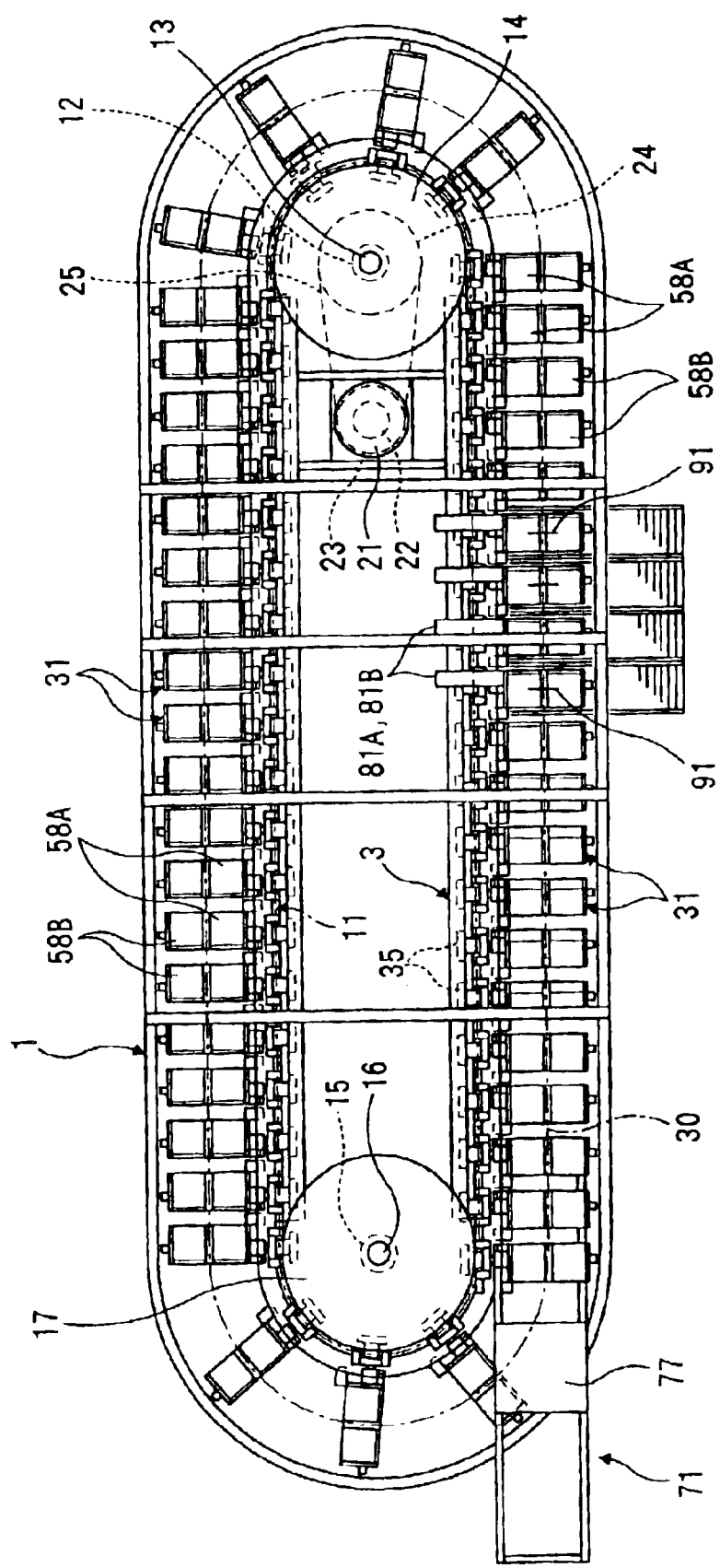
FIG. 3 is a plan view of the sorting system.

In FIGS. 2 and 3, a machine frame 1 that can be arbitrarily installed on a floor is provided with a roller chain (an example of an endless turning body) 11 so that the roller chain can be arbitrarily turned. That is, the machine frame 1 is elongate and is provided with vertical shafts 13 and 16 at the opposite ends thereof in the longitudinal direction thereof via bearing apparatuses 12 and 15, respectively, so that the vertical shafts 13 and 16 are rotatable. The vertical shafts 13 and 16 has sprocket wheels 14 and 17, respectively, attached to the top thereof and between which the roller chain 11 is wound.

The sprocket wheel 14 is used for driving and is linked with a motor (an example of a driving apparatus) 21 provided in the machine frame 1. That is, a driving sprocket 23 provided on a driving shaft 22 of the motor 21 and a passive sprocket 24 provided on the vertical shaft 13 are linked together via a transmission chain 25. The passive sprocket wheel 17 can be arbitrarily moved relative to the sprocket wheel 14 by a tension adjusting means (not shown) provided between the machine frame 1 and the bearing apparatus 15.

The roller chain 11 is provided with sorting conveyors 31 at predetermined pitches to form an endless conveying path 30. The group of sorting conveyors 31 are attached to a frame 3 in a cantilever manner.

That is, in FIGS. 1 to 4 and 7 to 10, the frame 3 is disposed between the sprocket wheels 14 and 17 and below a lateral pair of linear paths formed by the roller chain 11. The frame 3 is also attached to the machine frame 1. Here, the frame 3 is shaped like a mold rail and has a receiving guide surface 4 formed at the top thereof and at an inner position so as to face downward, a right and left guide surfaces 5 formed at an intermediate position, and a support guide surface 6 formed at an outer position so as to face upward. Furthermore, the frame 3 has a restricting guide surface (an example of a component of guide means, described later) 7 facing both upward and downward formed at an outer position of the bottom thereof.

Each of the sorting conveyors 31 is provided with a movement member 32 located at the position of the frame 3. The movement member 32 is connected to a bottom surface of the roller chain 11 using link pins 11a also as connectors. A longitudinal pair of guide rollers 33 are provided below the movement member 32 so as to be guide while being fitted between the right and left guide surfaces 5.

The movement member 32 has a lateral support shaft 34 penetrating therethrough and being provided with a received roller 35 so that the roller 35 can be arbitrarily rotated idly. The received roller 35 is abutted against by the receiving guide surface 4 from below. Furthermore, at the side outer than the movement member 32, a supported roller 36 is freely and rotatably provided at the support shaft 34, and this supported roller 36 is contacted to the support guide surface 6 from above.

The support shaft 34 is externally elongate and is provided with a conveyor frame 40 via a bearing 38. Thus, the conveyor frame 40 is attached to the roller chain 11 so as to arbitrarily incline around a horizontal axis, i.e. support shaft axis 34a, which lies at right angles to the conveying path 30. In this case, the support shaft 34 is biased frontward within the sorting conveyor relative to the conveying path 30. Thus, the conveyor frame 40 is automatically inclined around the support shaft axis because of its own weight in such a manner that its rear portion lies below its front portion.

The conveyor frame 40 is composed of an inner frame portion 41, an intermediate frame portion 42, and an outer frame portion 43. The inner frame portion 41 and the outer frame portion 43 are supported on the support shaft 34 via a bearing 38, with the intermediate frame portion 42 penetrated by the support shaft 34. A connection shaft 44 is provided behind the support shaft 34 so as to extend over the frame portions 41 to 43. Connection members 45 are provided at a plurality of locations between the connection shaft 44 and the support shaft 34. The components 41 to 45 constitute an example of the conveyor frame 40.

The sorting conveyor 31 is provided with a pair of front rollers (examples of front wheels) 52A and 52B and a pair of rear rollers (examples of rear wheels) 57A and 57B, both pairs extending in a transverse direction W. The sorting conveyor 31 is also provided with a pair (plurality) of endless belts (examples of endless turning bodies) 58A and 58B wound between the rollers 52A and 57A and between the rollers 52B and 57B, respectively, each pair of rollers being arranged opposite each other in a longitudinal direction V. Accordingly, the endless belts 58A and 58B can be arbitrarily turned along the conveying path 30.

That is, the conveyor frame 40 has a front wheel shaft 50 installed in a front portion thereof and extending in the transverse direction W. The front wheel shaft 50 is rotatably supported on the frame portions 41 to 43 via a bearing 51. The front wheel shaft 50 has a right front roller 52B, one of the front wheels, connected to a right portion thereof via a half-moon shaft portion 53. Further, the front wheel shaft 50 has a left front roller 52A connected to a left portion thereof and a cylindrical shaft (another example of a front wheel shaft) 54 externally fitted thereon and connected to the left front roller 52A so that the cylindrical shaft 54 is relatively rotatable via a bearing 55.

Furthermore, rear wheel shafts 56A and 56B extending in the transverse direction W are provided between the frame portions 41 to 43, arranged adjacent to each other in the rear of the conveyor frame 40. The rear wheel shafts 56A and 56B are provided with rear rollers 57A and 57B, respectively, so that the rollers 57A and 57B can be arbitrarily rotated idly. Endless belts 58A and 58A are wound between the rollers 52A and 57A and between the rollers 52B and 57B, respectively, each pair of rollers being arranged opposite each other in the longitudinal direction V. Accordingly, the endless belts 58A and 58B are constructed so as to be arbitrarily turned along the conveying path 30.

The endless belts 58A and 58B have with crossbars 59A and 59B installed on outer surfaces thereof at four locations. The groups of crossbars 59A and 59B are disposed so that the two crossbars of each pair can be simultaneously positioned over or under the corresponding rollers. A bracket 60 extends rearward from the rear of the inner frame portion 41 of the conveyor frame 40 and has a guided roller (an example of a guided body) 61 installed at an idle end thereof and fitted on the restricting guide surface 7.

The front wheel shaft 50 is provided with a friction wheel (an example of a passive wheel) 62B at an end thereof located closer to the frame body 3, the friction wheel 62B being linked with the right front roller 52B. Further, the cylindrical shaft 54 has a friction wheel (an example of a passive wheel) 62A integrally formed at an end located inside the friction wheel 62B, the friction wheel 62A being linked with the left front roller 52A. The friction wheels 62A and 62B have friction layers 62a and 62b, respectively, deposited on the outer circumference thereof.

The frame portions 41 to 43 of the conveyor frame 40 each have a side guide 63 extending laterally toward the endless belts 58A and 58B. Further, the movement member 32 is provide with guide rollers 39 arranged in front of and behind the received roller 35. Further, the movement member 32 is provided with a detected portion 65. The components 32 to 65 and others constitute an example of the sorting conveyor 31.

The conveying path 30 is elliptic and endless and has a lateral pair of linear path portions formed therein. One of the linear path portions has supply means 71 arranged opposite a start end thereof to feed books (examples of sorted articles) A onto the sorting conveyors 31 This linear path portion has a group of receipt sections 91 arranged opposite a terminal portion thereof to receive the books A from the sorting conveyors 31.

The sorting conveyor 31 has guide means for restricting inclination which is arranged along the conveying path 30 to guided roller 61 in the sorting conveyor 31. Accordingly, the sorting conveyor 31 receives the books A from the supply means 71 while the endless belts 58A and 58B are lying in the horizontal direction, is subsequently markedly inclined so that the supply side (for the receipt sections 91) of the endless belts on which the crossbars 59A and 59B are located lies below the other side, and then has its inclination reduced before reaching the group of receipt sections 91.

The guide means is partially composed of the restricting guide surface 7 described previously. The guide means is set so that while the guide roller 61 is being guided along the restricting guide surface 7, the endless belts 58A and 58B of the sorting conveyor 31 are inclined through a smaller angle (about 20°). The forming member of the restricting guide surface 7 of the frame body 3 is removed from a portion extending from a location beyond the supply means 71 to a location slightly beyond the receipt sections 91, with the guide (an example of a component of the guide means) 8 provided in this removed portion.

The guide 8 is composed of a start end lifting section 8a that lifts the guided roller 61 from the restricting guide surface 7, a higher horizontal portion 8b connected to the start end lifting section 8a and located above the restricting guide surface 7, a lowering section 8c connected to the upper horizontal portion 8b, a lower horizontal portion 8d connected to the lowering section 8c and located below the restricting guide surface 7, and a terminal lifting section 8e connected to the lower horizontal portion 8d to lead the guided roller 61 to the restricting guide surface 7.

In this case, while the guide roller 61 is being guided along the higher horizontal portion 8b, the endless belts 58A and 58B of the sorting conveyor 31 lie in the horizontal direction. On the other hand, while the guide roller 61 is being guided along the lower horizontal portion 8d, the endless belts 58A and 58B of the sorting conveyor 31 are inclined through a larger angle (about 45°). The guide 8 is mounted on the frame body 3.

The supply means 71 is composed of a plurality of belt conveyors, i.e. a receiving conveyor 72, an intermediate conveyor 73, a loading conveyor 74, and others. The start end of the receiving conveyor 72 forms a receiving section 75 that artificially or mechanically delivers the books A to the receiving conveyor 72. Further, the loading conveyor 74 is disposed so as to be inclined with its terminal located below its start end. An external portion of the terminal forms a loading section 76 that loads the books onto the sorting conveyors 31. A bar code reader 77 is provided in the supply means 71.

The group of receipt sections 91 are disposed below the conveying path 30. Each of the receipt sections 91 is provided with a pair of turning force applying means 81A and 81B for turning the endless belts 58A and 58B of the target sorting conveyor 31. The turning force applying means 81A and 81B are constructed so as to arbitrarily act individually on the front wheel shaft 50 and the cylindrical shaft 54, located closer to the frame body 3 (closer to one side of the sorting conveyors).

In this case, the turning force applying means 81A and 81B are constructed so as to arbitrarily move toward or away from the friction wheels 62A and 62B, the target passive wheels. The turning force applying means 81A and 81B are moved to and engaged with the friction wheels 62A and 62B, respectively, thereby rotating them using movement force exerted along the conveying path 30 for the sorting conveyors 31.

That is, in FIGS. 1, 6, 8, and 9, the machine frame 1 is provided with a holding frame 2 extending above and across the conveying path 30. The turning force applying means 81A and 81B have guided cylinder apparatuses 83A and 83B, respectively, mounted on the holding frame 2 via brackets 82A and 82B, respectively. The cylinder apparatuses 83A and 83B have piston rods 84A and 84B, respectively, facing downward and provided with higher elevators 85A and 85B, respectively. Lower elevators 87A and 87B are provided below the higher elevators 85A and 85B via 4-link mechanisms 86A and 86B, respectively, so as to arbitrarily elevate and lower relatively to the higher elevators. In this case, a lower swaying limit is imposed on the 4-link mechanisms 86A and 86B by abutting the links against stopper sections 88A and 88B of the higher elevators 85A and 85B, respectively.

Friction rails 89A and 89B are provided below the lower elevators 87A and 87B, respectively, so as to move vertically toward or away from the friction wheels 62A and 62B, respectively. The friction rails 89A and 89B have friction layers 89a and 89b, respectively, laid on the bottom surface thereof. Coil springs (examples of urging bodies) 90A and 90B are provided between the links of the 4-link mechanisms 86A and 86B and the higher elevator 85A and 85B, respectively to urge the 4-link mechanisms 86A and 86B, respectively, to the lower swaying limit. Thus, the friction layers 89a and 89b of the friction rails 89A and 89B are abutted against the friction wheels 62A and 62B, respectively, using the elastic force of the coil springs 90A and 90B, respectively.

Accordingly, the friction wheels 62A and 62B are abutted against the friction layers 89a and 89b, respectively, from below, with the friction rails 89A and 89B lowered together with the lower elevators 87A and 87B. Then, the friction wheels 62A and 62B can be rotated using the movement force of the sorting conveyors 31 to drive and rotate the rollers 57A and 57B, respectively, thereby individually turning the endless belts 57A and 57B, respectively.

In this case, the friction acting length of the friction rails 89A and 89B is set so that the pair of crossbars 59A and 59B which have been located above the rollers 57A and 57B are arranged below the rollers 52A and 52B, and 57A and 57B, respectively, whereas the pair of crossbars 59A and 59B which have been located below the rollers 52A and 52B, and 57A and 57B, respectively, are arranged above the rollers 52A and 52B, and 57A and 57B, respectively. These components 82A, 82B to 90A, and 90B constitute examples of the turning force applying means 81A and 81B.

Figure 8:
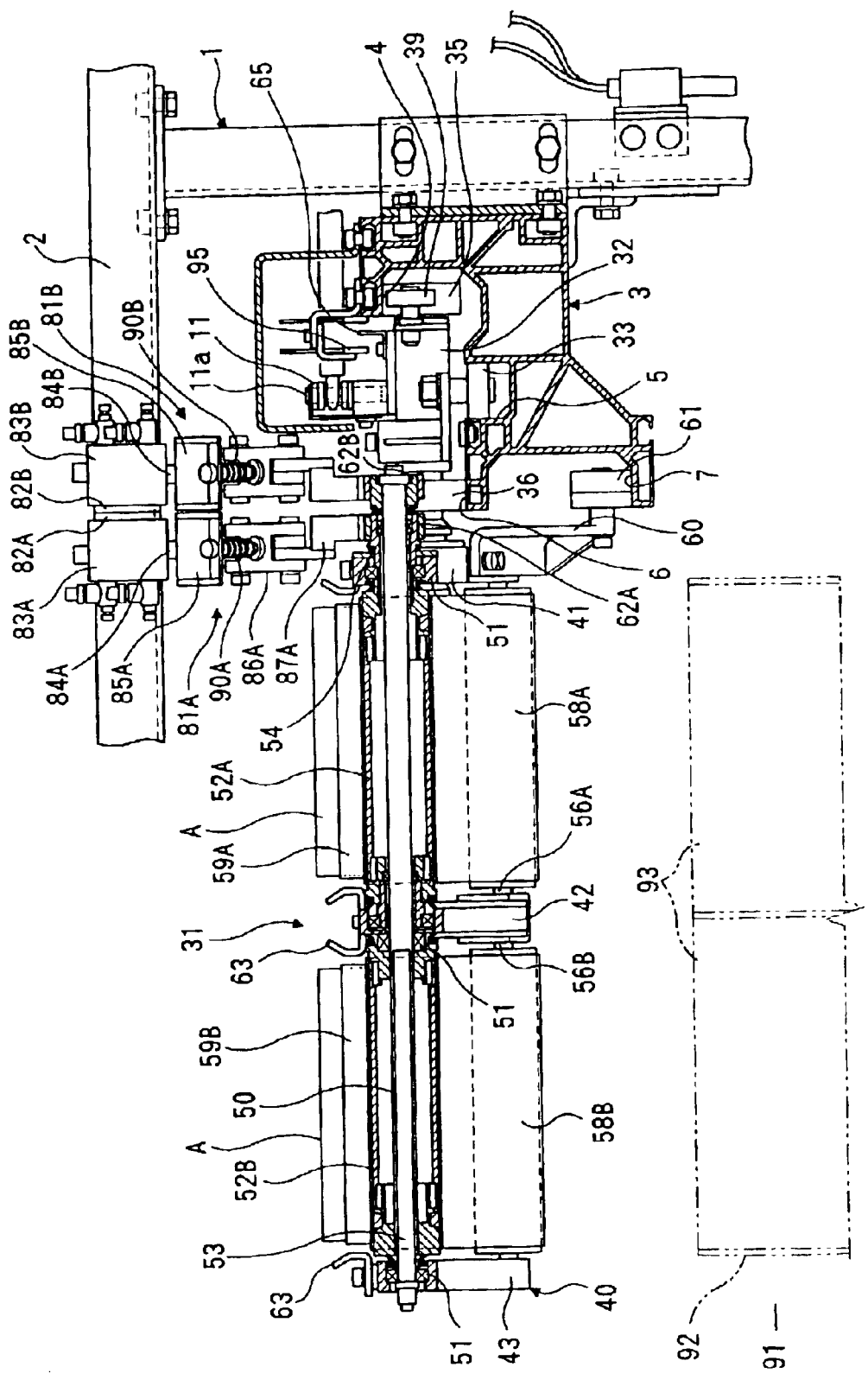
FIG. 8 is a vertically sectional front view showing that the sorting conveyor in the sorting system is inclined through a small angle.
Figure 9:
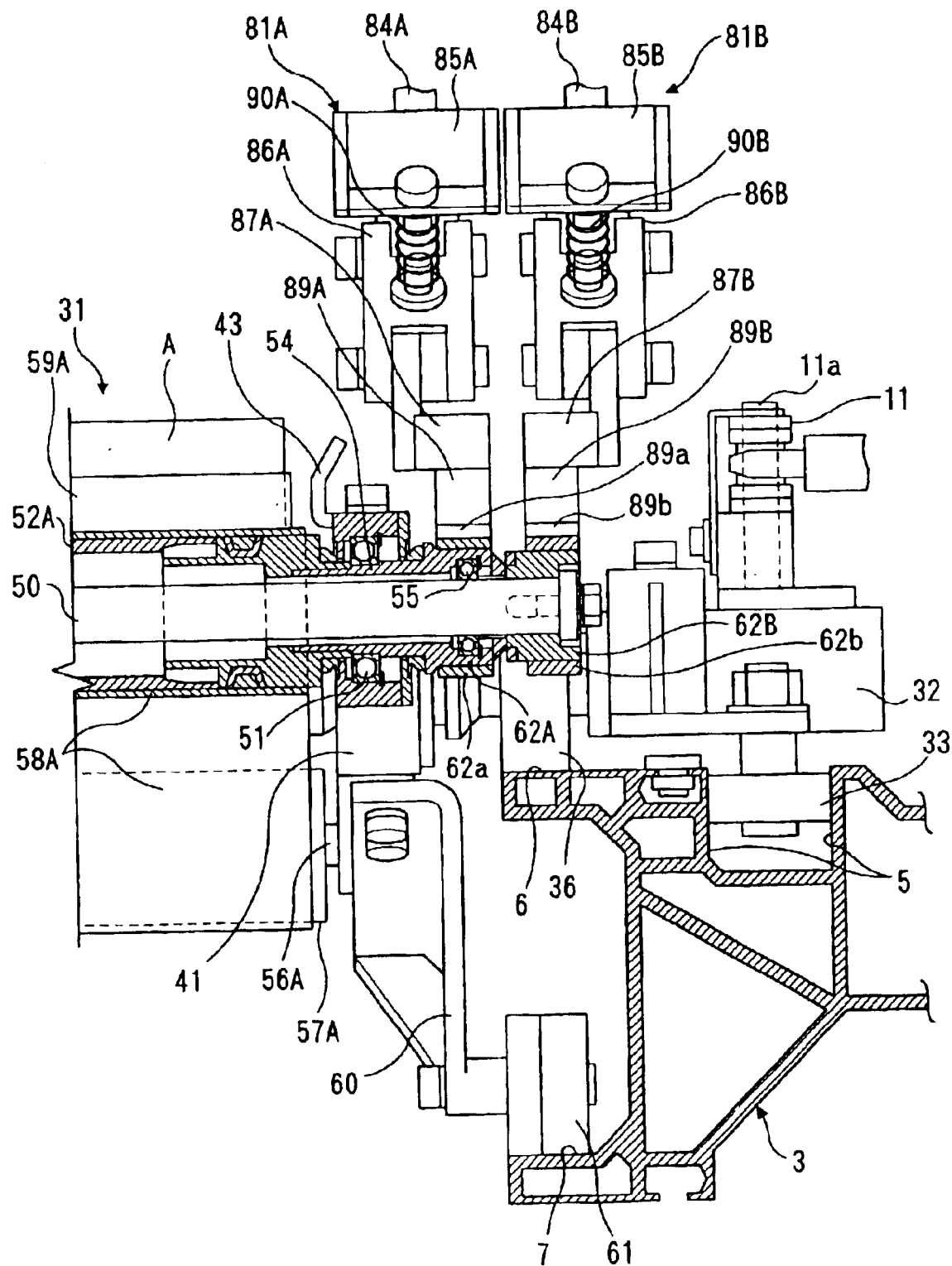
FIG. 9 is a vertically sectional front view of an essential part of the sorting system, showing that the sorting conveyor is inclined through a small angle.

In FIGS. 2, 3, and 8, the group of receipt sections 91 are constructed by providing housing boxes 92 with their top open below the conveying path 30. Each of the housing boxes 92 has a right and left housing sections 93 formed therein. Further, detection means 95 is provided correspondingly to each receipt section 91 in order to detect the detected portion 65 of the sorting conveyor 31.

The operation of the first embodiment, described above, will be described below.

Before the sorting system is used to sort the books A, each receipt section 91 has empty housing boxes 92, set therein. The housing boxes 92 are provided for each shop, and a signal for each shop is input to the control section.

Further, the group of sorting conveyors 31 are moved on the conveying path 30 like an endless train. The sorting conveyors are moved via the movement member 32, connected to the roller chain 11 and supported and guided on the frame body 3, by causing the motor 21 to drive and rotate the driving shaft 22 and transmitting this rotating force to the sprocket wheel 14 via the driving sprocket 23, the transmission chain 25, the passive sprocket 24, and the vertical shaft 13 to turn the roller chain 11.

In this case, the lateral deflection or deviation of the movement member 32 can be restricted by using the right and left guide surfaces 5 to guide the longitudinal pair of guide rollers 33. Further, the movement member 32 can be prevented from floating by receiving and guiding the guided roller 35 and the guide rollers 39 on the receiving guide surface 4. Furthermore, the movement member 32 can be prevented from lowering by supporting and guiding supported rollers 36 on the support guide surface 6.

Consequently, the group of sorting conveyors 31 are attached to the roller chain 11 in a cantilever manner, i.e. the driving and support arrangements are disposed only at one side of the sorting conveyors, thereby simplifying the system and enabling easy maintenance. Nevertheless, the group of sorting conveyors 31 can always be stably moved. The group of sorting conveyors 31 being moved normally have each group of the crossbars 59A and 59B located over or under the rollers 52A and 52B, and 57A and 57B.

Under these conditions, the books A to be sorted are placed on the receiving conveyor 72 of the supply means 71 via the receiving section 75. During transportation from the receiving conveyor 72 to the intermediate conveyor 73, the bar code reader 77 reads the bar codes on the books A and inputs the read signal to the control signal. The books A from the loading conveyor 74 are then loaded into the sorting conveyor 31, located below the loading section 76.

Figure 4:
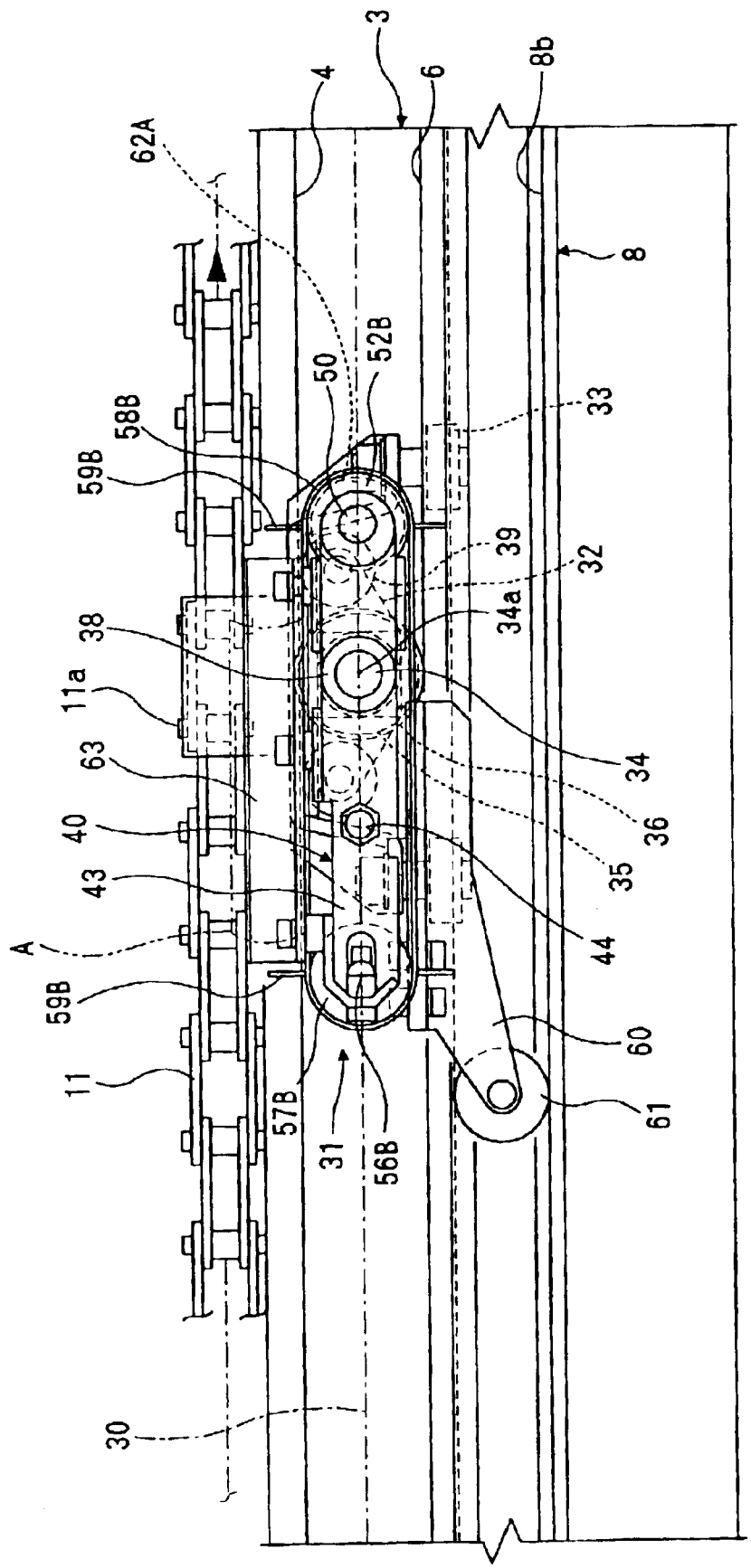
FIG. 4 is a side view showing that the sorting conveyor in the sorting system extends in a horizontal direction.
Figure 7:
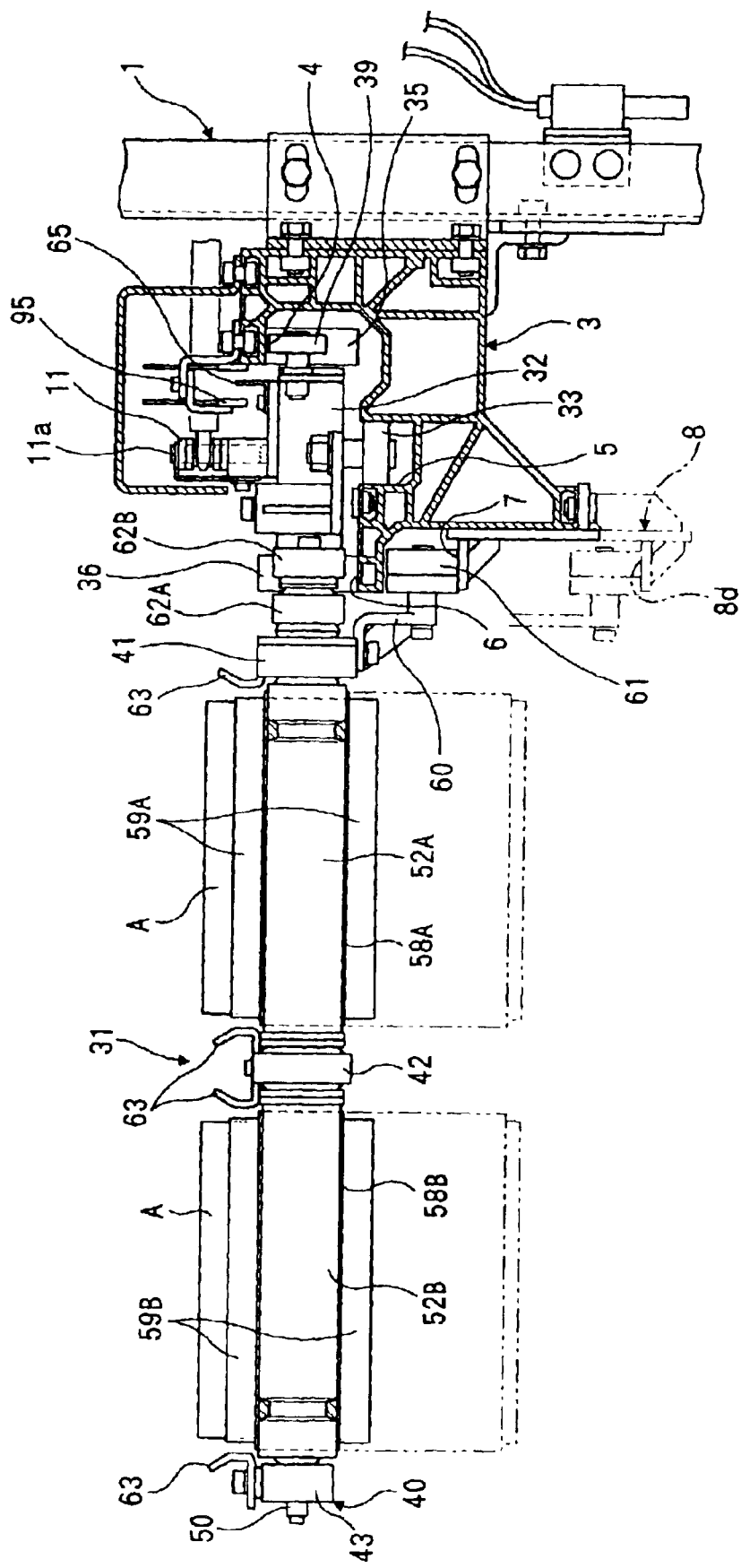
FIG. 7 is a vertically sectional front view showing that the sorting conveyor in the sorting system extends in the horizontal direction.
Figure 10A:
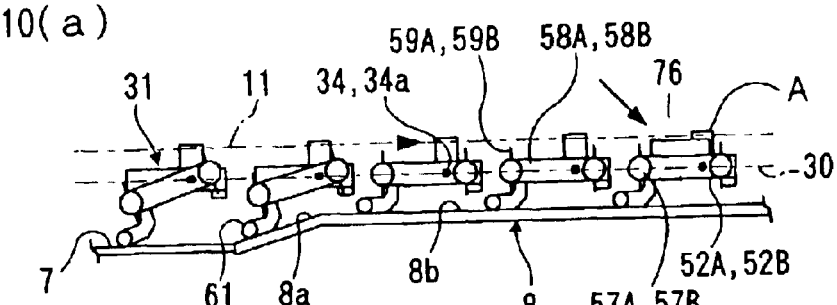
FIG. 10 is a schematic side view illustrating how the sorting conveyor in the sorting system is inclined.

In this case, the guided roller 61 of the sorting conveyor 31 is guided along the higher horizontal portion 8b to allow the endless belts 58A and 58B to extend in the horizontal direction, as shown in FIG. 4, by the solid line in FIG. 7, and in FIG. 10A. Accordingly, the books A can be easily and reliably loaded onto the endless belts 58A and 58B, extending in the horizontal direction. In this case, it is determined onto which of the lateral pair of endless belts 58A and 58B each book A is to be loaded. This determines in which of the right and left housing sections 93 each book A is housed.

As described above, the sorting conveyor 31 supporting the books A on the endless belts 58A and 58B can be moved from the loading section 76 toward the group of receipt sections 91. During this movement, as shown in FIG. 10B, the guided roller 61 is guided from the higher horizontal portion 8b to the lowering section 8c to incline (turn) the sorting conveyor 31, i.e. the endless belts 58A and 58B around the support shaft axis 34a so that the supply side at the rear end thereof lies below the other side.

Figure 5:
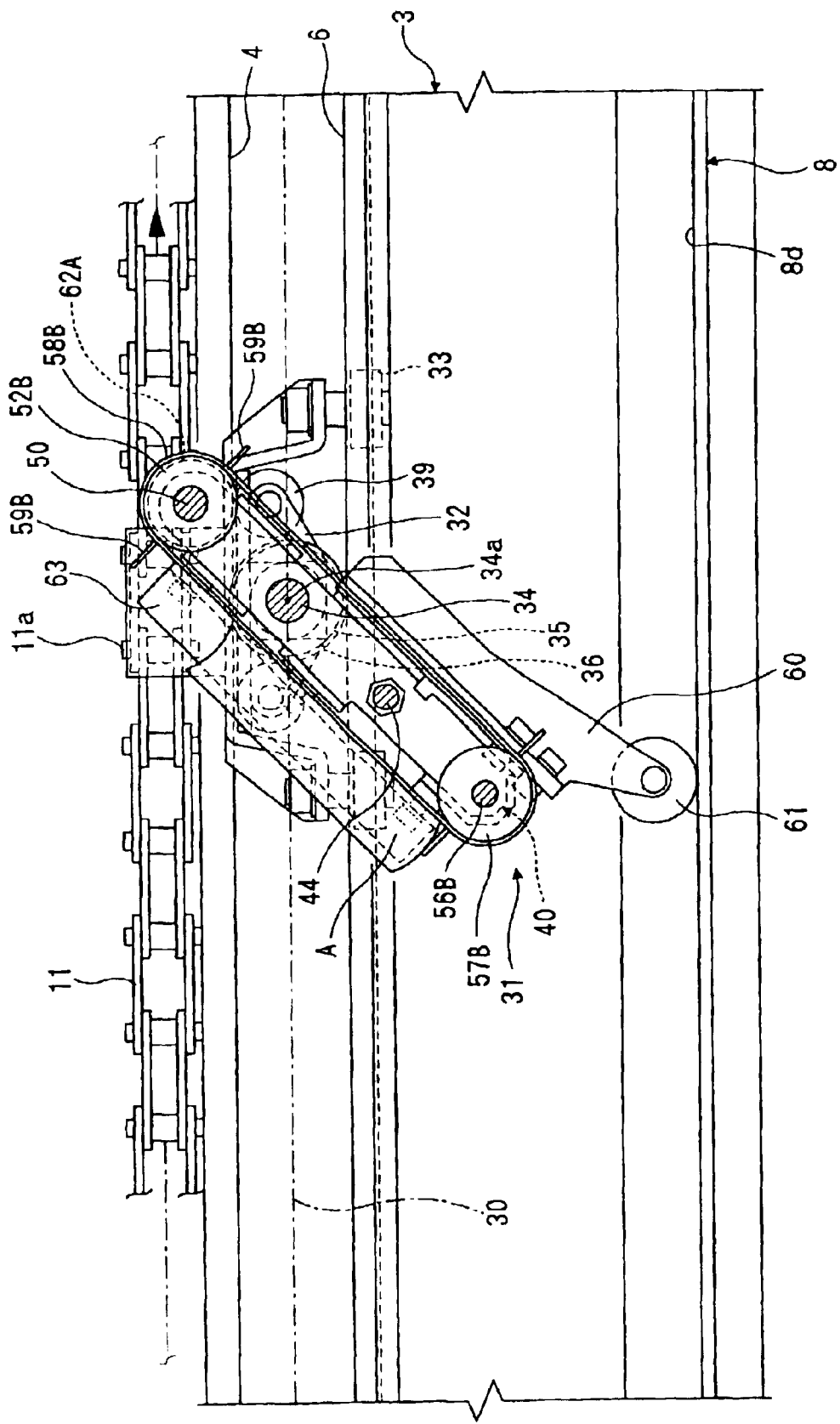
FIG. 5 is a vertically sectional side view showing that the sorting conveyor in the sorting system is inclined through a large angle.
Figure 10B:
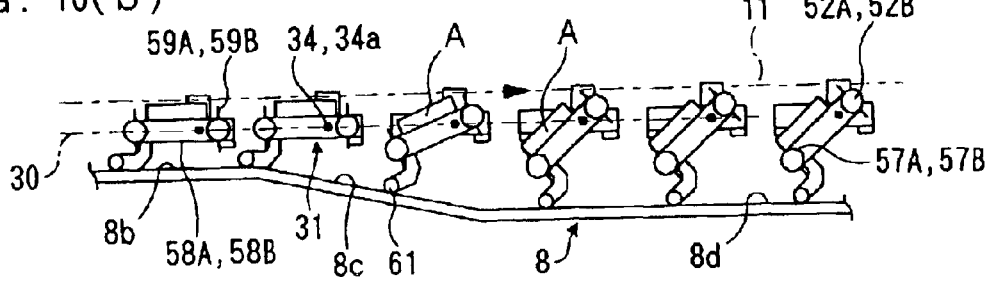

Then, the guided roller 61 is guided from the lowering section 8c to the lower horizontal portion 8d to allow the endless belts 58A and 58B to be pronouncedly inclined (through about 45°) as shown in FIG. 5, by the imaginary line in FIG. 7, and in FIG. 10B. This inclination causes the books A to slide on the endless belts 58A and 58B and abut against the crossbars 59A and 59B located at the supply side at the rear end thereof. Thus, the books A, which may have been loaded onto the endless belts 58A and 58B in incorrect directions, can have their supported positions automatically corrected.

Figure 10C:
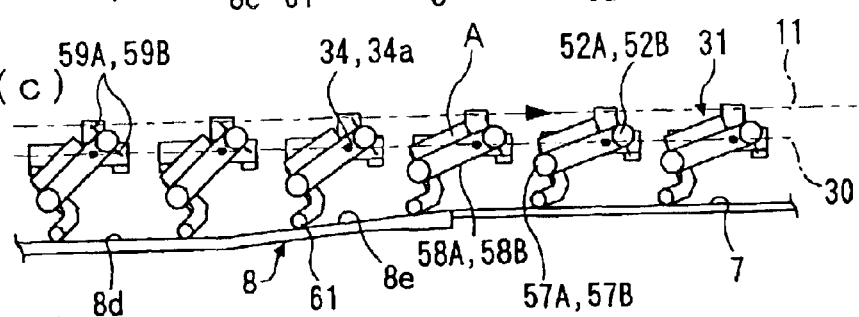

After the supported positions of the books A thus have been corrected, the guided roller 61 is guided from the lower horizontal portion 8d to the terminal elevating section 8e to incline (turn) the endless belts 58A and 58B around the support shaft axis 34a so as to raise the supply side at the rear end thereof, as shown in FIG. 10C. Then, the guided roller 61 is guided from the terminal elevating section 8e to the restricting guide surface 7 to reduce the inclination of the endless belts 58A and 58B (down to about 20°), as shown in FIGS. 1, 6, 8, and 10D.

In this manner, the group of sorting conveyors 31 with the endless belts 58A and 58B inclined through the smaller angle are moved above the group of receipt sections 91. Then, before the sorting conveyor 31 reaches the target receipt section 91, the detection means 95 detects the detected portion 65 of the sorting conveyor 31. In response to an instruction from the control section, to which the detection signal has been input, the turning force applying means 81A and 81B corresponding to this receipt section 91 are operated. At this time, one or both of the turning force applying means 81A and 81B may be operated.

That is, the cylinder apparatuses 83A and 83B perform an extending operation to lower the higher elevators 85A and 85B, respectively, to lower the lower elevators 87A and 87B via the 4-link mechanisms 86A and 86B, respectively. Accordingly, the friction rails 89A and 89B are moved downward. Then, the friction wheels 62A and 62B of the arriving sorting conveyor 31 slip under the friction rails 89A and 89B, respectively, and roll on the friction layers 89a and 89b of the friction rails 89A and 89B, respectively. Thus, large frictional resistance is generated to reliably rotate the friction wheels 62A and 62B.

Figure 6:
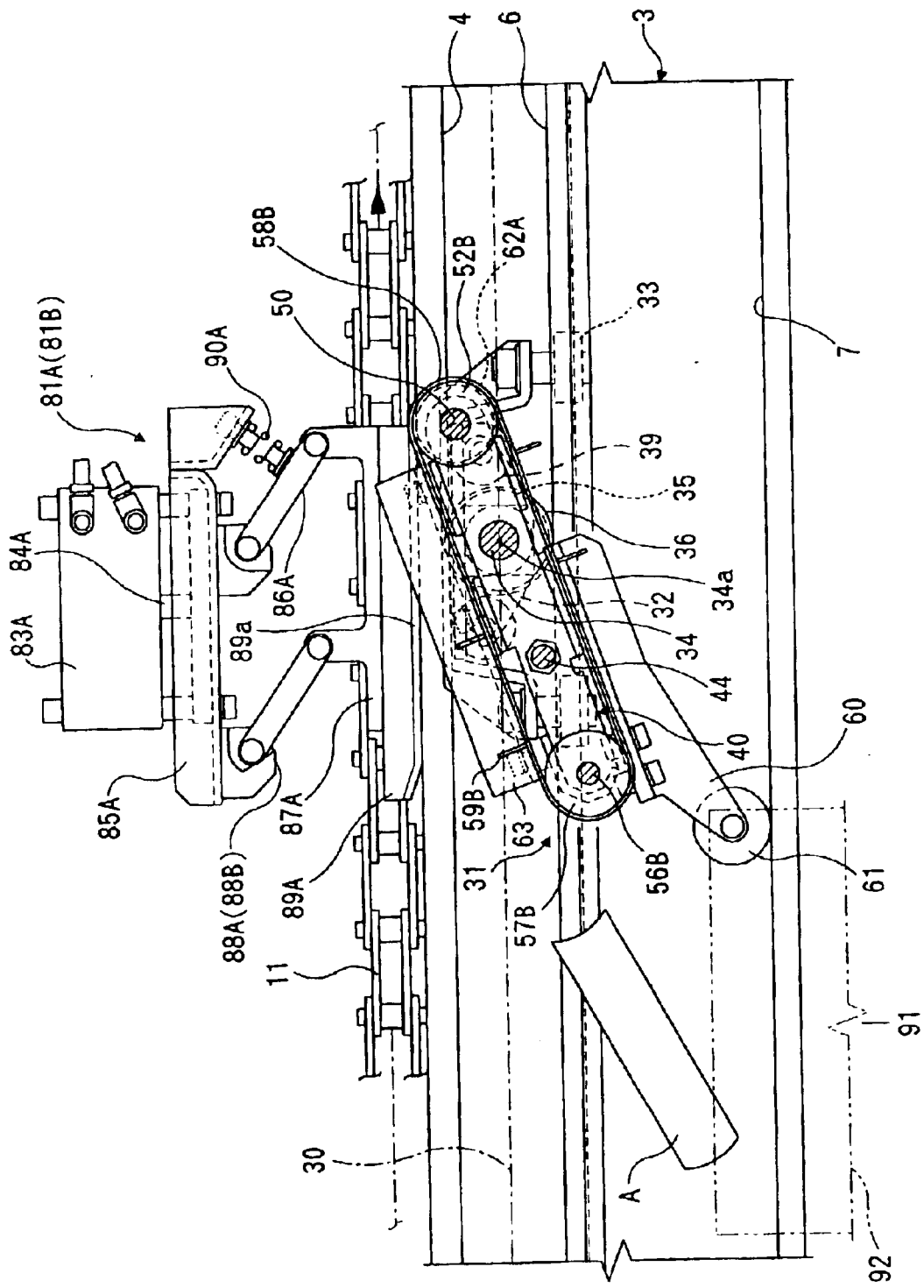
FIG. 6 is a vertically sectional side view showing that the sorting conveyor in the sorting system is inclined through a small angle.
Figure 10D:
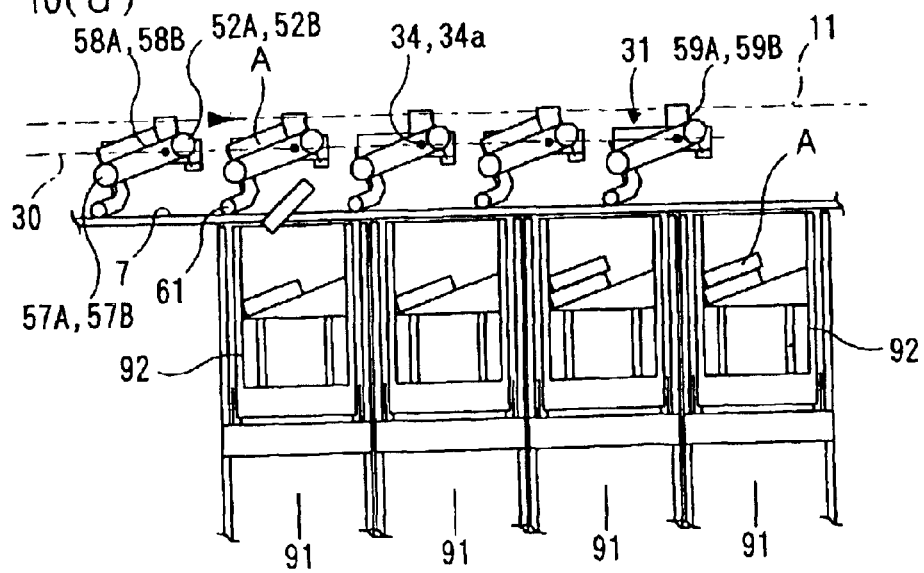

At this time, the front roller 52A can be forcibly rotated via the cylindrical shaft 54, to which the friction wheel 62A is attached. The forced rotation of the front roller 52A enables the endless belt 58A to be turned along the conveying path 30 while rotating the front roller 52A idly so that the higher portion of the endless belt 58A is inclined and lowered. Consequently, as shown in FIGS. 6 and 10D, the book A supported on the endless belt 58A is fed and loaded into the target housing box 92.

Further, the other front roller 52B can be forcibly rotated via the front wheel shaft 50, to which the friction wheel 62B is attached. The forced rotation of the front roller 52B enables the endless belt 58B to be turned along the conveying path 30 while rotating the front roller 52B idly so that the higher portion of the endless belt 58B is inclined and lowered. Consequently, as shown in FIGS. 6 and 10D, the book A supported on the endless belt 58B is fed and loaded into the target housing box 92.

In this case, one or both of the turning force applying means 81A and 81B are operated in response to an instruction from the control section, as described previously. Accordingly, when both turning force applying means 81A and 81B are operated, both endless belts 58A and 58B can be turned along the conveying path 30. Consequently, the books A supported on the endless belts 58A and 58B are fed and loaded into the corresponding housing sections 93 of the target housing box 92.

On the other hand, when one of the turning force applying means 81A and 81B is operated, the corresponding one of the endless belts 58A and 58B can be turned along the conveying path 30. Consequently, only the book A supported on the endless belt 58A or 58B is fed and loaded into the corresponding housing section 93 of the target housing box 92.

In this manner, when the books A are loaded into the corresponding housing sections 93 of the target housing box 92, the books A on the endless belt 58A and 58B have their directions or the like corrected. Thus, the books A can be fed in a fixed direction and can maintain this direction all through the operation of leaving the endless belts 58A and 58B. As a result, the books can be suitably sorted into the corresponding housing sections 93 of the housing box 92.

Further, as described previously, the endless belts 58A and 58B, which have been inclined, are turned to feed the books A. Accordingly, the group of receipt sections 91 can be disposed below the group of sorting conveyors 31, i.e. the conveying path 30, thereby saving space and enabling books to be sorted and loaded directly into the housing sections 93 of the housing box 92. Therefore, compared to a form provided with a separate slide (slide slope), required planar space is reduced to enable easy layout.

The friction wheels 62A and 62B are slipped under the friction rails 89A and 89B, respectively, while the friction rails 89A and 89B are slightly elevated against the force of the coil springs 90A and 90B. Accordingly, the friction layers 62A and 62B are brought into elastic press contact with the friction layers 89a and 89b to allow the friction wheels 62A and 62B to be reliably rotated depending on the amount of movement.

Thus, the endless belts 58A and 58A are reliably turned by a half rotation so that the pair of crossbars 59A and 59B which have been located above the rollers 52A and 52B, and 57A and 57B, respectively are arranged below the rollers 52A and 52B, and 57A and 57B, respectively, whereas the pair of crossbars 59A and 59B which have been located below the rollers 52A and 52B, and 57A and 57B, respectively are arranged above the rollers 52A and 52B, and 57A and 57B, respectively.

As described previously, once the books A have been completely fed by turning the endless belts 58A and 58B, the turning force applying means 81A and 81B are inversely operated to elevate the friction rails 89A and 89B, respectively, to their inoperative positions. To feed the subsequently transported books A into the same housing box 92, the friction rails 89A and 89B may stand by at the operative positions, where they have been lowered, without being elevated to the inoperative positions.

Since the housing box 92 has a vertically extending outside shape, the books A can be easily housed in the housing box 92 and the housing box 92 can be easily moved into and out of the receipt section 91.

Figure 11:
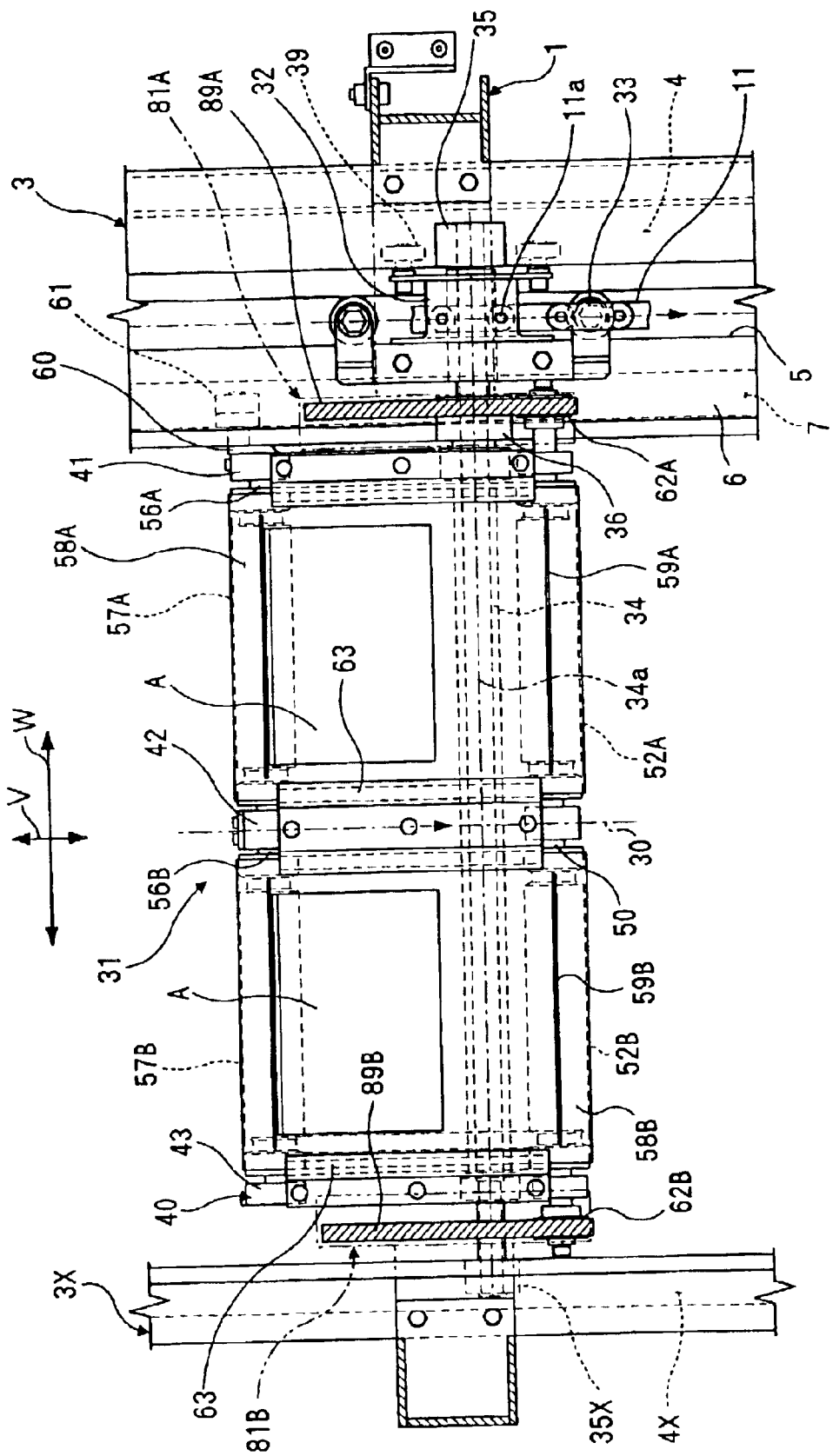
FIG. 11 is a plan view showing a second embodiment of the present invention wherein the sorting conveyor in the sorting system is inclined through a small angle.
Figure 12:
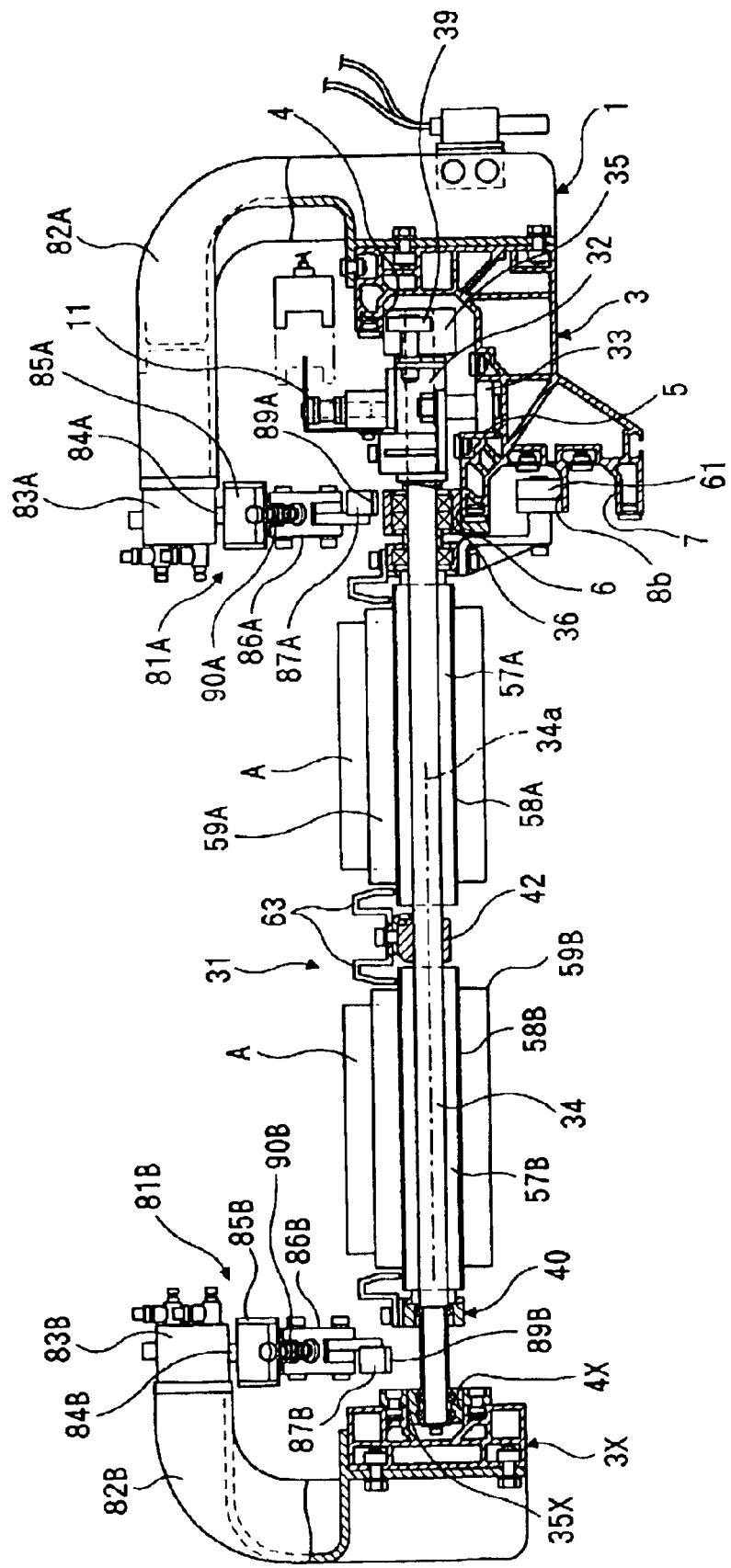
FIG. 12 is a vertically sectional front view showing that the sorting conveyor in the sorting system is inclined through a small angle.

Now, a second embodiment of the present invention will be described with reference to FIGS. 11 and 12.

In the second embodiment, the group of sorting conveyors 31 are attached to the frame body in a cantilever manner. The turning force applying means 81A and 81B are arranged at the right and left sides of the sorting conveyor 31, respectively, so as to arbitrarily act on the friction wheels (passive wheels) 62A and 62B, respectively, located opposite each other.

That is, a frame body 3X is disposed opposite the frame body 3 via the conveying path 30 and has a receiving guide surface 4X formed at an inner position thereof so as to face upward. A received roller 35X is provided at the outer end of the lateral support shaft 34 so as to arbitrarily rotate idly. Further, the receiving guide surface 4X abuts against the received roller 35X from above. Thus, the group of sorting conveyors 31 are attached to the frame bodies 3 and 3X in an center impeller manner.

Further, the outer end of the front wheel shaft 50 is projected. This projecting portion is provided with the friction wheel 62B, opposite which the turning force applying means 81B is arranged. Accordingly, the turning force applying means 81A and 81B are disposed at the respective lateral ends of the sorting conveyor so as to arbitrarily act on the friction wheels 62A and 62B, located opposite each other.

In the second embodiment, the roller chain 11 is turned to enable the group of sorting conveyors 31 connected to the roller chain 11 to be moved on the conveying path 30 like an endless train, while being supported and guided along the frame bodies 3 and 3X. In this case, the inner end of the sorting conveyor 31 can be prevented from floating by receiving and guiding the received roller 35 and the guide roller 39 on the receiving guide surface 4. The outer end of the sorting conveyor 31 can be prevented from lowering by supporting and guiding the received roller 35X on the receiving guide roller 4X.

Therefore, the group of sorting conveyors 31 are connected to the roller chain 11 at one side thereof, i.e. the driving and support arrangements are disposed only at one side of the sorting conveyors, thereby simplifying the system and enabling easy maintenance. Nevertheless, the group of sorting conveyors 31 can be more stably moved because they are attached to the frame bodies 3 and 3X in a center impeller manner.

Before the sorting conveyor 31 reaches the target receipt section 91, the turning force applying means 81A and 81B corresponding to this receipt section 91, i.e. one or both of the turning force applying means 81A and 81B are operated to force out the books A supported on the endless belts 58A and 58B to load them into the target housing box 92. In this case, since the turning force applying means 81A and 81B are disposed at the right and left sides of the sorting conveyor, respectively, it is easy to check the operation of each of the turning force applying means 81A and 81B or to carry out maintenance inspections.

Figure 13:
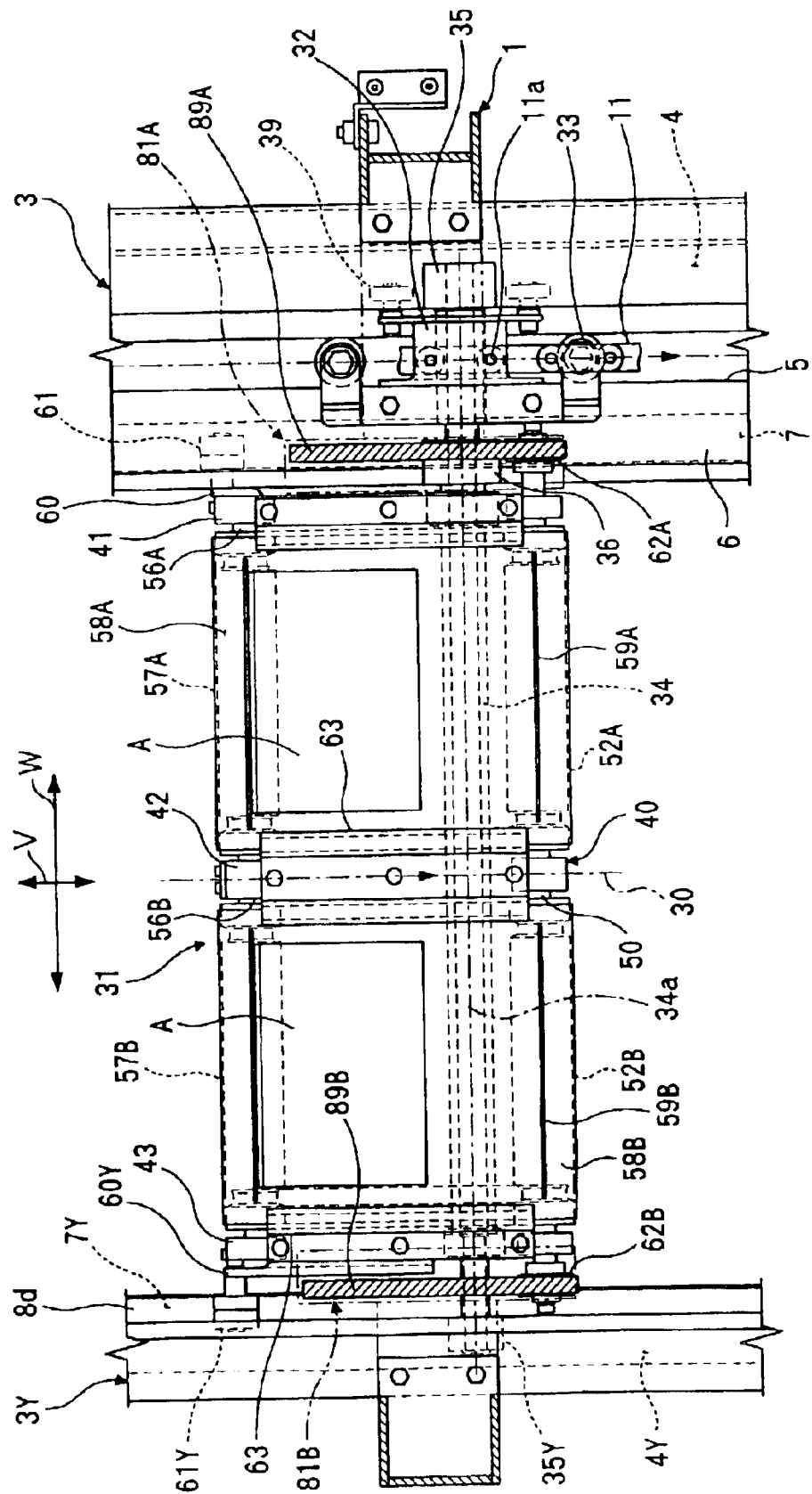
FIG. 13 is a plan view showing a third embodiment of the present invention wherein the sorting conveyor in the sorting system is inclined through a small angle.
Figure 14:
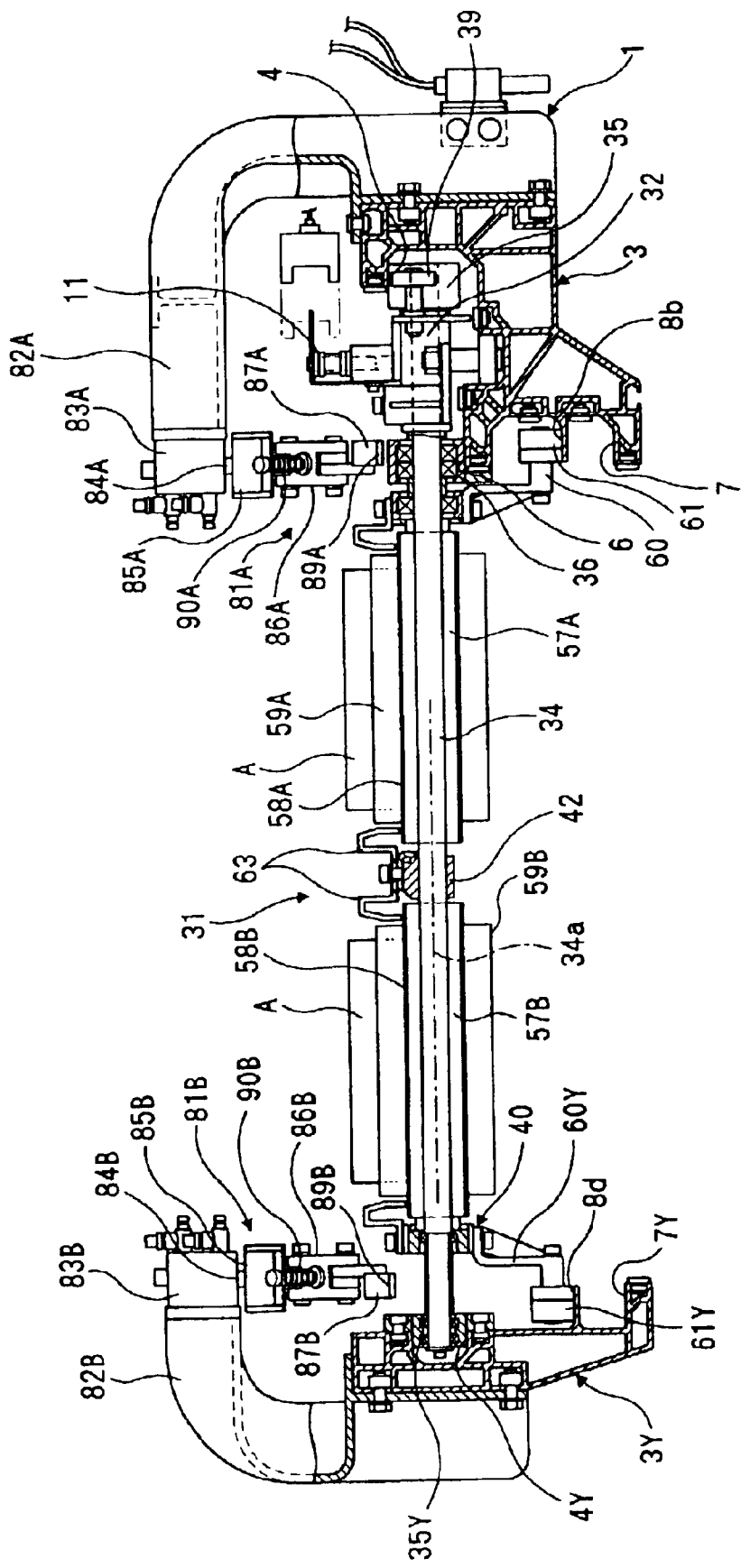
FIG. 14 is a vertically sectional front view showing that the sorting conveyor in the sorting system is inclined through a small angle.
Figure 15:
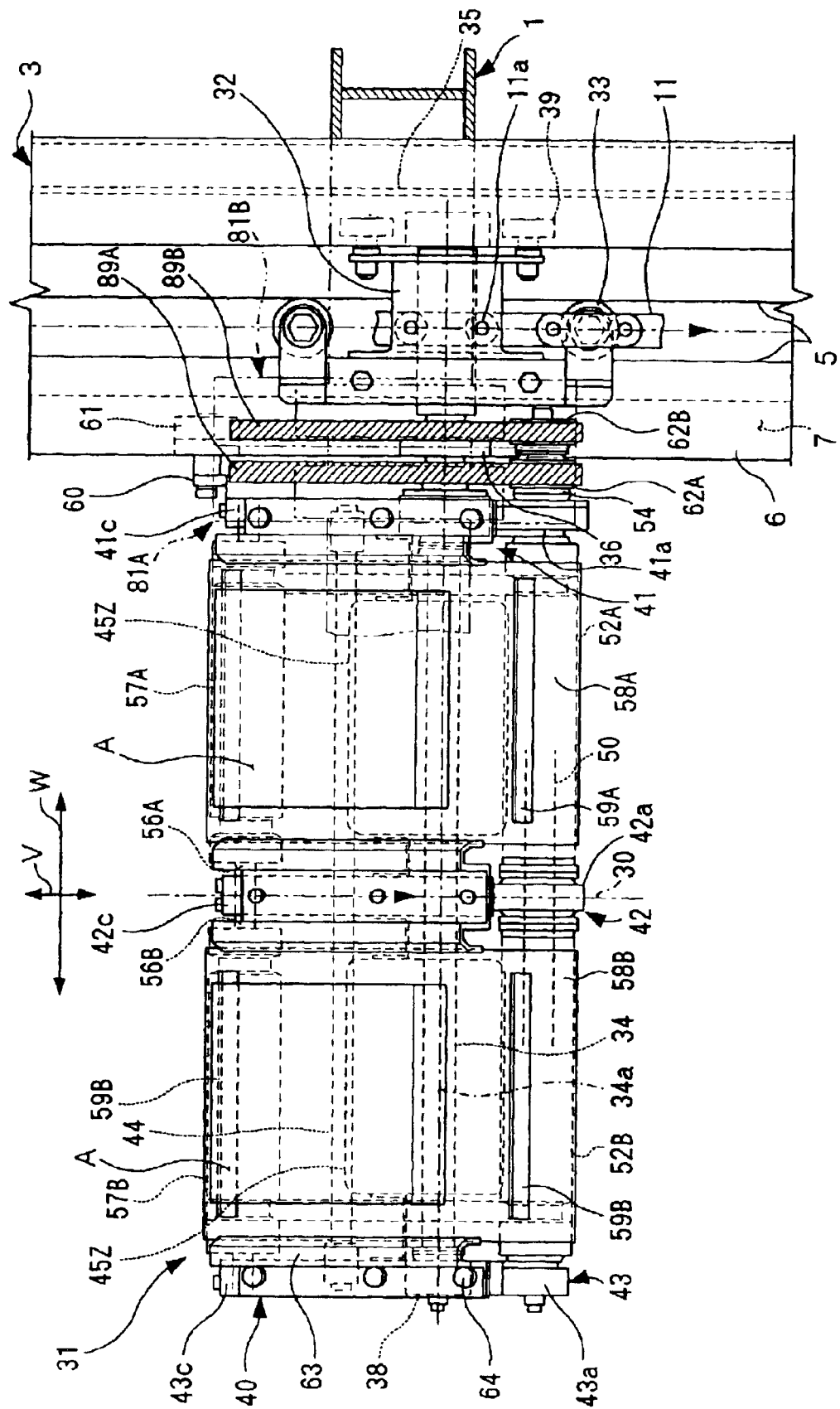
FIG. 15 is a plan view showing a fourth embodiment of the present invention wherein the sorting conveyor in the sorting system is inclined through a small angle.
Figure 16:
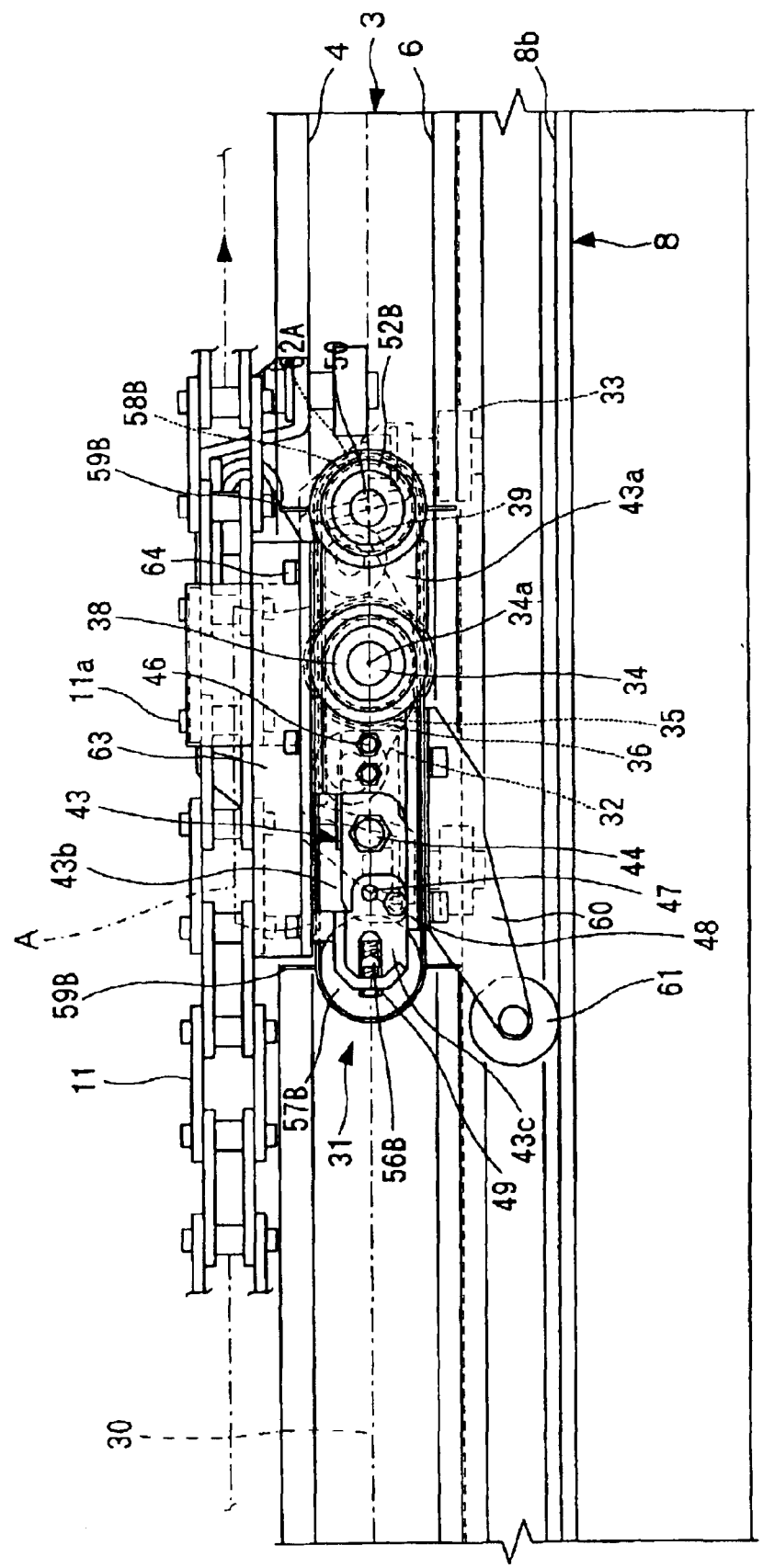
FIG. 16 is a side view showing that the sorting conveyor in the sorting system extends in the horizontal direction.
Figure 17:
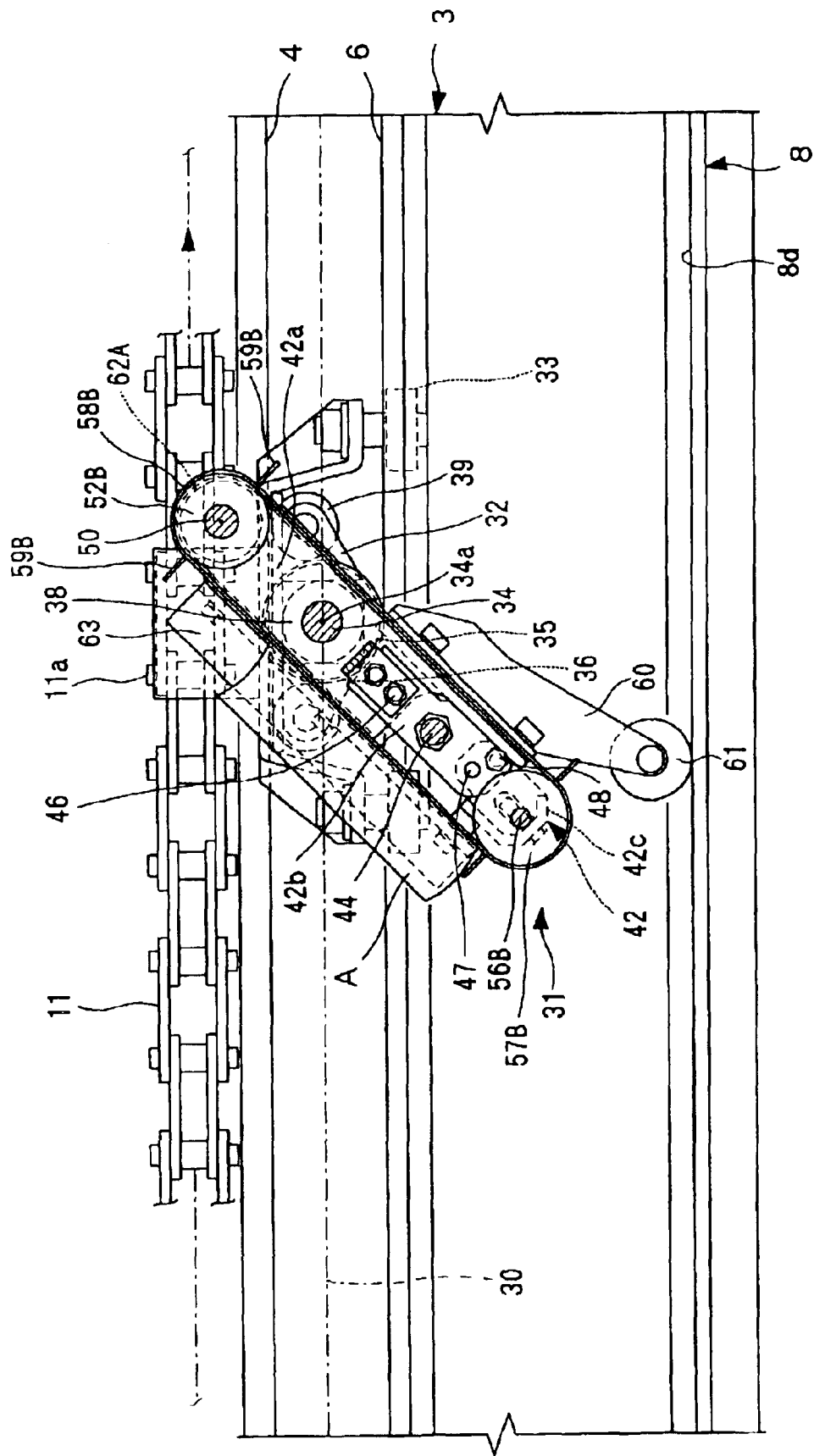
FIG. 17 is a vertically sectional side view showing that the sorting conveyor in the sorting system is inclined through a large angle.
Figure 18:
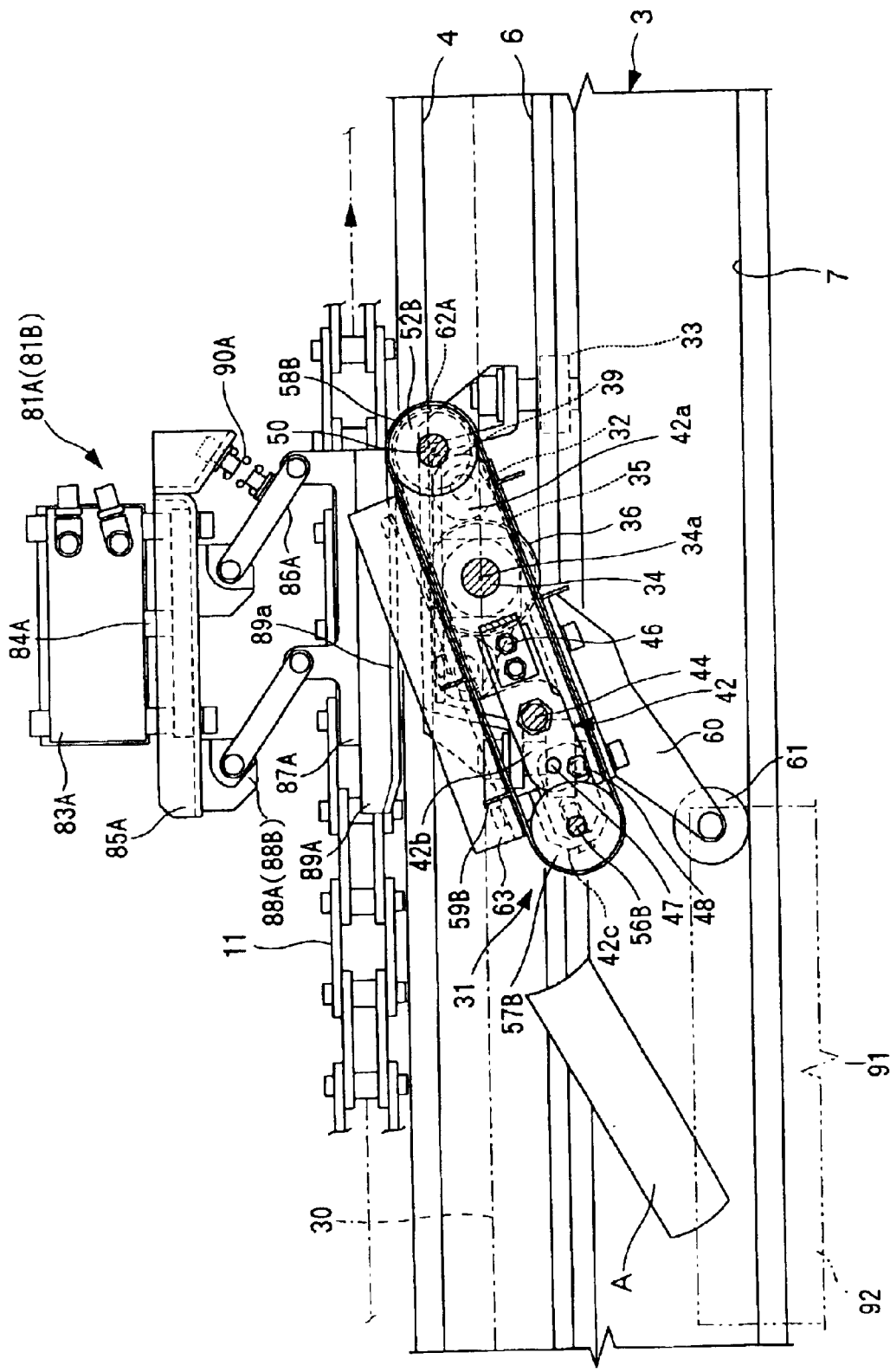
FIG. 18 is a vertically sectional side view showing that the sorting conveyor in the sorting system is inclined through a small angle.
Figure 19:
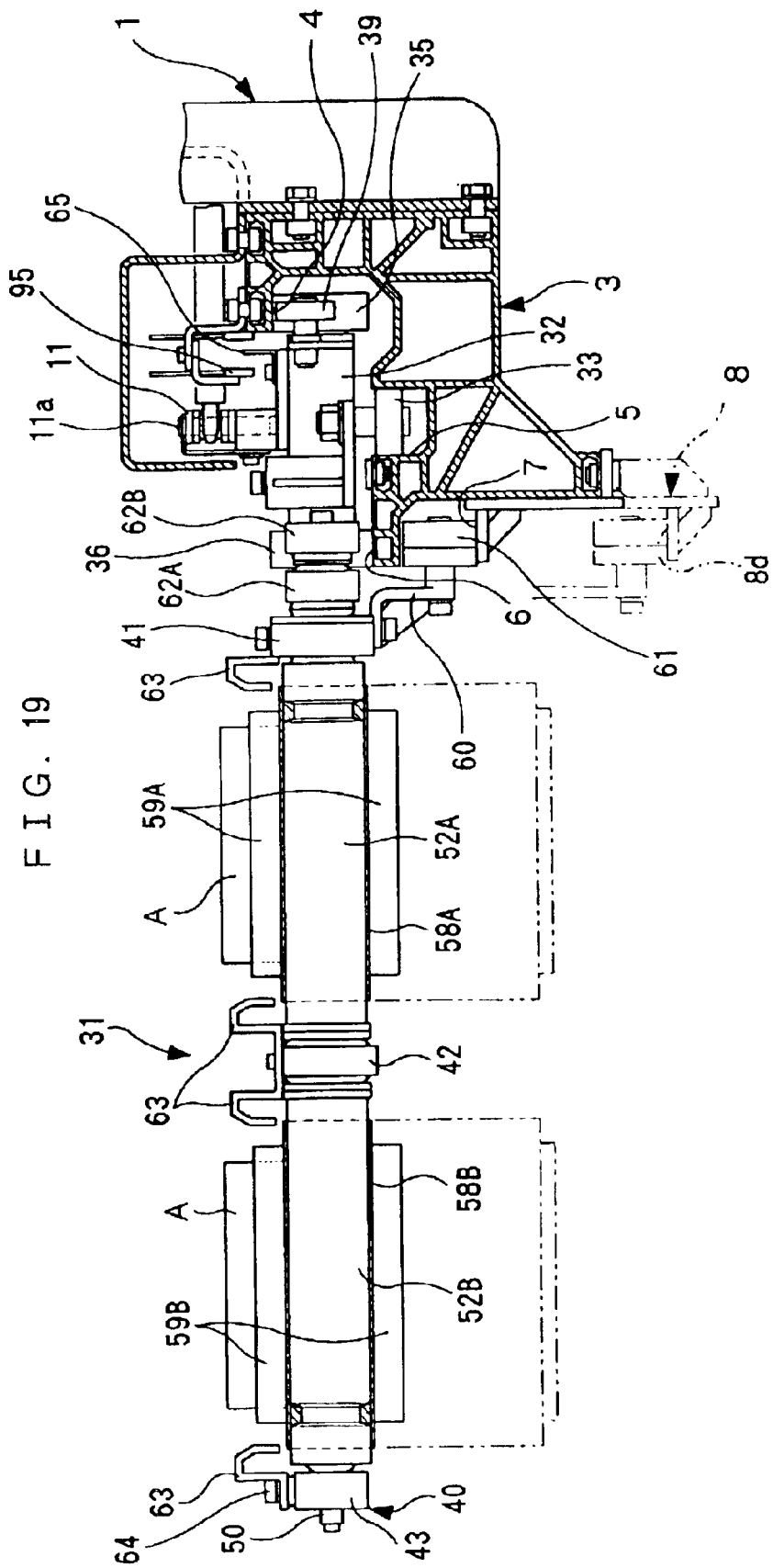
FIG. 19 is a vertically sectional front view showing that the sorting conveyor in the sorting system extends in the horizontal direction.

Now, a third embodiment of the present invention will be described with reference to FIGS. 13 and 14.

In the third embodiment, the group of sorting conveyors 31 are attached to the frame body in a cantilever manner. The sorting conveyor 31 has guided bodies arranged at the right and left sides thereof, respectively, and a pair of guide means along which the respective guided bodies are guided.

That is, a frame body 3Y is disposed opposite the frame body 3 via the conveying path 30 and has a receiving guide surface 4Y formed thereon so as to face upward, and a restricting guide surface (an example of a component of the guide means) 7Y formed thereon so as to face both upward and downward. A received roller 35Y is provided at the outer end of the lateral support shaft 34 so as to arbitrarily rotate idly. Further, the receiving guide surface 4Y abuts against the received roller 35Y from above. Thus, the group of sorting conveyors 31 are attached to the frame bodies 3 and 3Y in an center impeller manner.

Further, the outer end of the front wheel shaft 50 is projected. This projecting portion is provided with the friction wheel 62B, opposite which the turning force applying means 81B is arranged. Accordingly, the turning force applying means 81A and 81B are disposed at the respective lateral ends of the sorting conveyor so as to arbitrarily act on the friction wheels 62A and 62B, located opposite each other.

Furthermore, a bracket 60Y extends rearward from the rear of the outer frame portion 43 of the conveyor frame 40. The bracket 60Y has a guided roller (an example of a guided body) 61Y installed at an idle end thereof and fitted on the restricting guide surface 7Y. Thereby, the guided rollers (guided bodies) 61, 61Y are distributed left and right and provided at the side of the sorting conveyors 31, and there are also provided a pair of restricting guide surfaces (constituent material of guide means) 7, 7Y by which these guided rollers 61, 61Y are guided.

In the third embodiment, the roller chain 11 is turned to enable the group of sorting conveyors 31 connected to the roller chain 11 to be moved on the conveying path 30 like an endless train, while being supported and guided along the frame bodies 3 and 3X. In this case, the inner end of the sorting conveyor 31 can be prevented from floating by receiving and guiding the received roller 35 and the guide roller 39 on the receiving guide surface 4. The outer end of the sorting conveyor 31 can be prevented from lowering by supporting and guiding the received roller 35Y on the receiving guide roller 4Y.

Therefore, the group of sorting conveyors 31 are connected to the roller chain 11 at one side thereof, i.e. the driving and support arrangements are disposed only at one side of the sorting conveyors, thereby simplifying the system and enabling easy maintenance. Nevertheless, the group of sorting conveyors 31 can be more stably moved because they are attached to the frame bodies 3 and 3X in a center impeller manner.

When the sorting conveyor 31 having the books A on the endless belts 58A and 58B moves from the loading section 76 to the group of receipt sections 91, the guide rollers 61 and 61Y are guided from the upper horizontal portion 8b to the lowering section 8c. Accordingly, the sorting conveyor 31, i.e. the endless belts 58A and 58B are inclined (turned) around the support shaft axis 34a so that the supply side at the rear end thereof lies below the other side.

Then, the guided rollers 61 and 61Y are guided from the lowering section 8c to the lower horizontal portion 8d to allow the endless belts 58A and 58B to be markedly inclined (through about 45°). This inclination causes the supported positions of the books A to be corrected. Then, the guided rollers 61 and 61Y are guided from the lower horizontal portion 8d to the terminal elevating section 8e to incline (turn) the endless belts 58A and 58B around the support shaft axis 34a so as to raise the supply side at the rear end thereof. Then, the guided rollers 61 and 61Y are guided from the terminal elevating section 8e to the restricting guide surfaces 7 and 7Y to reduce the inclination of the endless belts 58A and 58B (down to about 20°).

In this manner, the guided rollers 61 and 61Y, arranged at the right and left sides of the sorting conveyor, are supported and guided along the guide means composed of the guide 8 and the restricting guide surfaces 7 and 7Y. Thus, the group of sorting conveyors 31 can always be smoothly and stably inclined and swayed laterally synchronously without being subjected to twist or the like.

As described above, the group of sorting conveyors 31 with the endless belts 58A and 58B inclined through the smaller angle are moved above the group of receipt sections 91. Then, before the sorting conveyor 31 reaches-the target receipt section 91, the books A supported on the endless belts 58A and 58B can be fed and loaded into the target housing box 92 by operating the turning force applying means 81A, 81B corresponding to the receipt section 91, i.e. one or both of the turning force applying means 81A and 81B. In this case, since the turning force applying means 81A and 81B are arranged at the right and left sides of the sorting conveyor, respectively, it is easy to check the operation of each of the turning force applying means 81A and 81B or carry out maintenance inspections.

In the first to third embodiments, the lateral pair of endless belts 58A and 58B are provided. However, two or more endless belts may be provided, with turning force applying means disposed at an intermediate position.

Now, a fourth embodiment of the present invention will be described with reference to FIGS. 15 to 23.

In the fourth embodiment, the conveyor frame 40 is composed of the inner frame body 41, the intermediate frame body 42, and the outer frame body 43. The frame bodies 41 to 43 are composed of front frame portions 41a, 42a, and 43a, intermediate frame portions 41b, 42b, and 43b, and rear frame portions 41c, 42c, and 43c.

The front frame portions 41a and 43a of the inner and outer frame bodies 41 and 43 in the front frame portions 41a, 42a and 43a are supported on the support shaft 34 via the bearing 38, and the front frame portion 42a of the intermediate frame body 42 has the support shaft 34 inserted therethrough. Further, the rear ends of the front frame portions 41a, 42a, and 43a have the front ends of intermediate portions 41b, 42b, and 43b, respectively, connected thereto via connectors (bolts, nuts, and the like) 46. When the connectors 46 are used to connect these portions together, a belt receiver 45Z facing upward is simultaneously connected. Further, a connection shaft 44 is provided so as to extend over the intermediate frame portions 41b, 42b, and 43b.

The rear frame portions 41c, 42c, and 43c are each an example of an swaying section. The front end of each rear frame portion can be swayed, via a horizontal pin 47 extending in the lateral direction W, in the vertical direction relative to the rear end of the corresponding one of the intermediate frame portions 41b, 42b, and 43b. In this case, the rear frame portions 41c, 42c, and 43c can be swing ably and arbitrarily swayed in the vertical direction between a horizontal position where they are flush with the intermediate frame portions 41b, 42b, and 43b, respectively, and a standing position where they are stood up. In the horizontal position, the rear frame portions can be arbitrarily fixed to the corresponding intermediate frame portions 41b, 42b, and 43b using fixtures (bolts or the like, the bolts being passed through the rear frame portions 41c, 42c, and 43c and then screwed into the intermediate frame portions 41b, 42b, and 43b) 48 provided therebetween. The components 41 to 48 constitute an example of the conveyor frame 40.

The front frame portions 41a to 43a of the conveyor frame 40 each have the front wheel shaft 50 installed in front thereof and extending in the transverse direction W. The front wheel shaft 50 is rotatably supported on the front frame portions 41a to 43a via the bearing 51 and the like. Furthermore, the rear frame portions 41c, 42c, and 43c, located adjacent to each other in the rear of the conveyor frame 40, have the rear wheel shafts 56A and 56B installed therebetween via a position adjusting member 49 and extending in the transverse direction W. The rear wheel shafts 56A and 56B are provided with the rear rollers 57A and 57B, respectively, so that the rollers 57A and 57B can be arbitrarily rotated idly. For each of the frame bodies 41 to 43 of the conveyor frame 40, the side guides 63 are removably provided at the right and left sides of each of the endless belts 58A and 58b via the connectors (bolts and nuts) 64.

Figure 20:
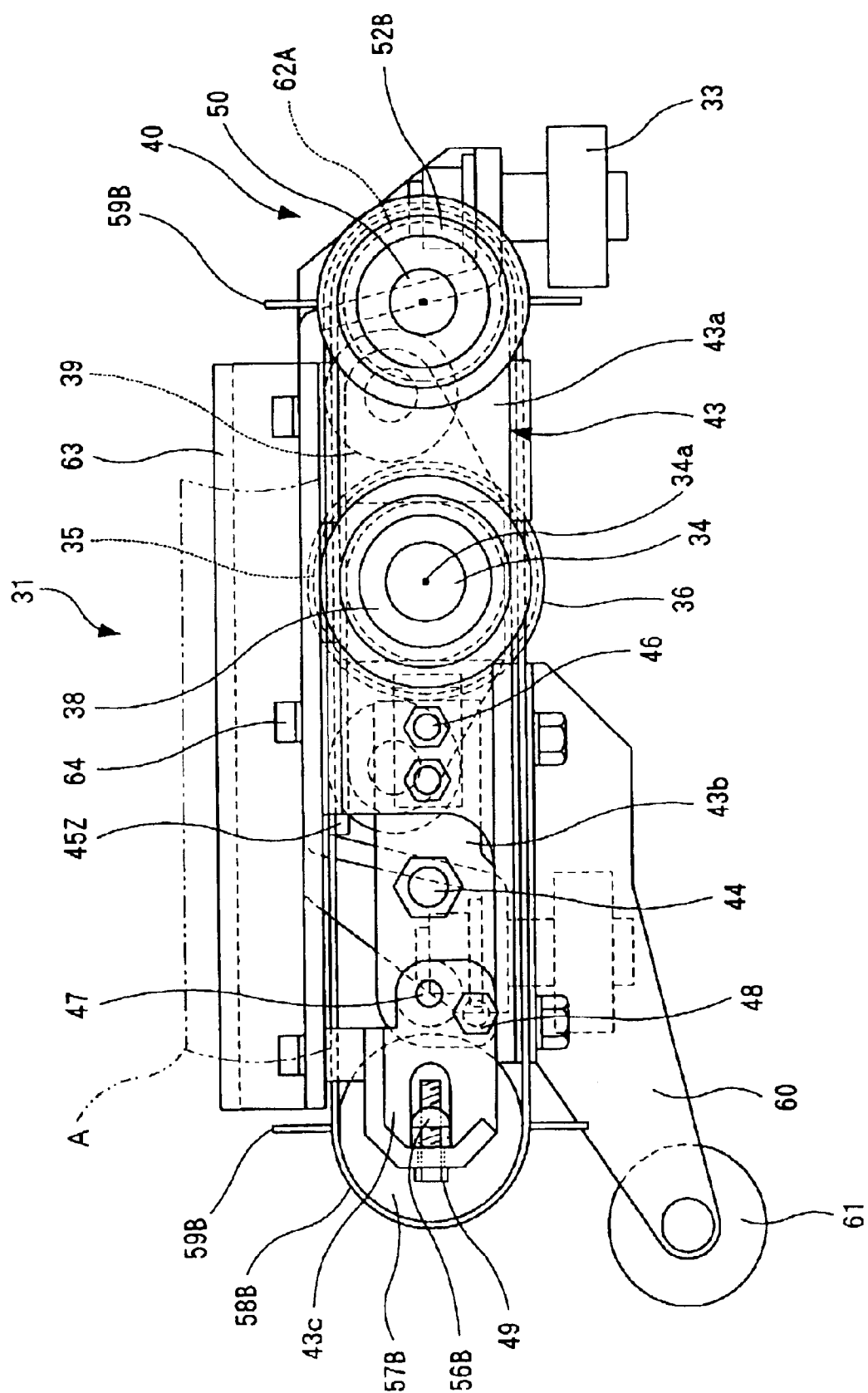
FIG. 20 is a side view showing the sorting conveyor in the sorting system wherein endless turning bodies are extended.
Figure 21:
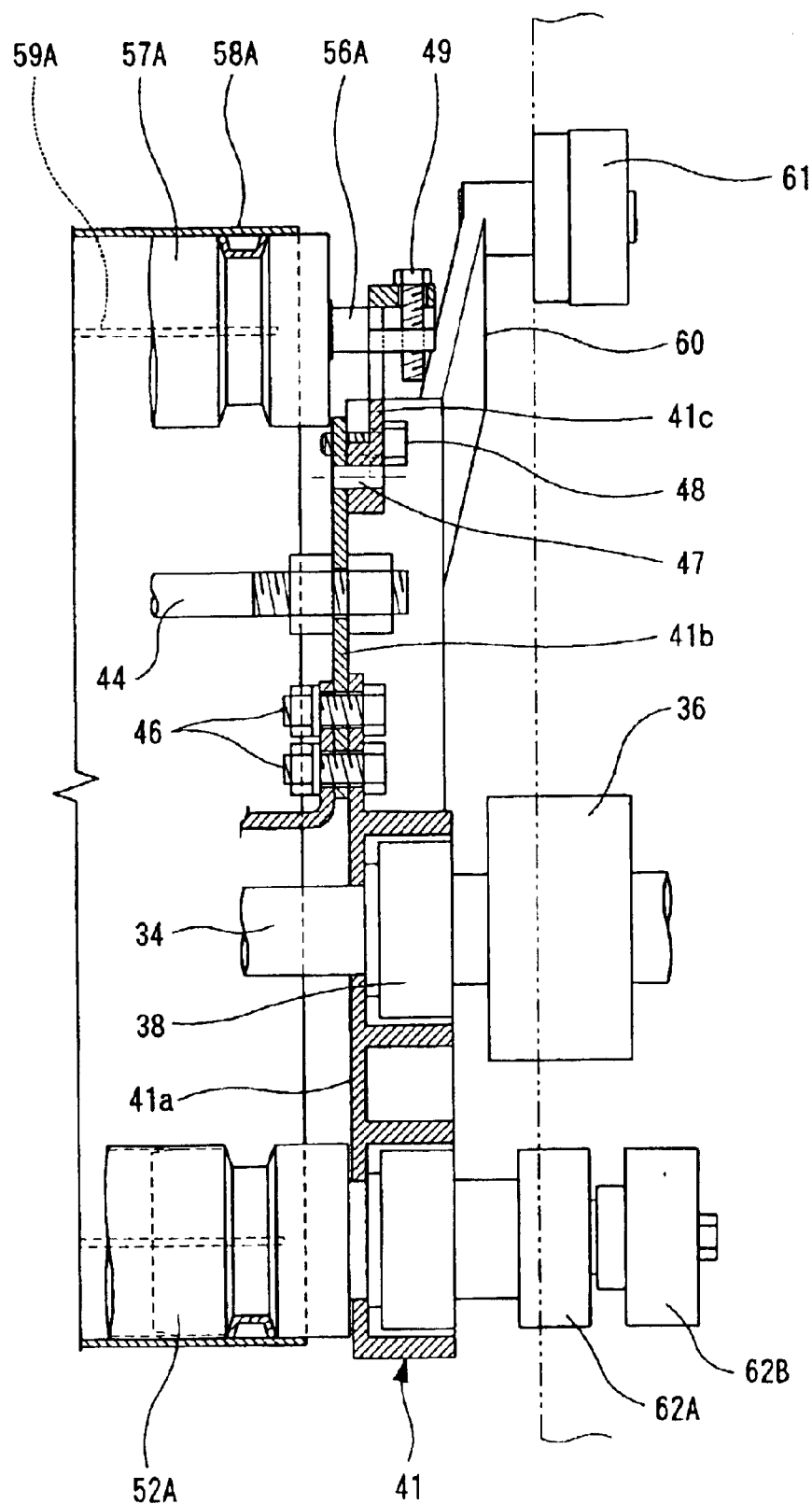
FIG. 21 is a partially cutaway plan view of the sorting conveyor in the sorting system wherein the endless turning bodies are extended.

In the fourth embodiment, while the books A are being sorted as described above and shown in FIGS. 15 to 19, the conveyor frame 40 assumes the horizontal position where the rear frame portions 41c, 42c, and 43c are flush with the intermediate frame portions 41b, 42b, and 43b, respectively, as shown in FIGS. 20 and 21. This horizontal position is maintained on the basis of the fixing operation of the fixtures 48. In this position, the endless belts 58A and 58B can be extended between the rear rollers 57A and 57B and the front rollers 52A and 52B, respectively. Therefore, the friction wheels 62A and 62B are rotated to rotate the front rollers 52A and 52B, thereby enabling the endless belts 58A and 58B to be reliably turned by a predetermined amount without being subjected to a slip or the like.

Figure 22:
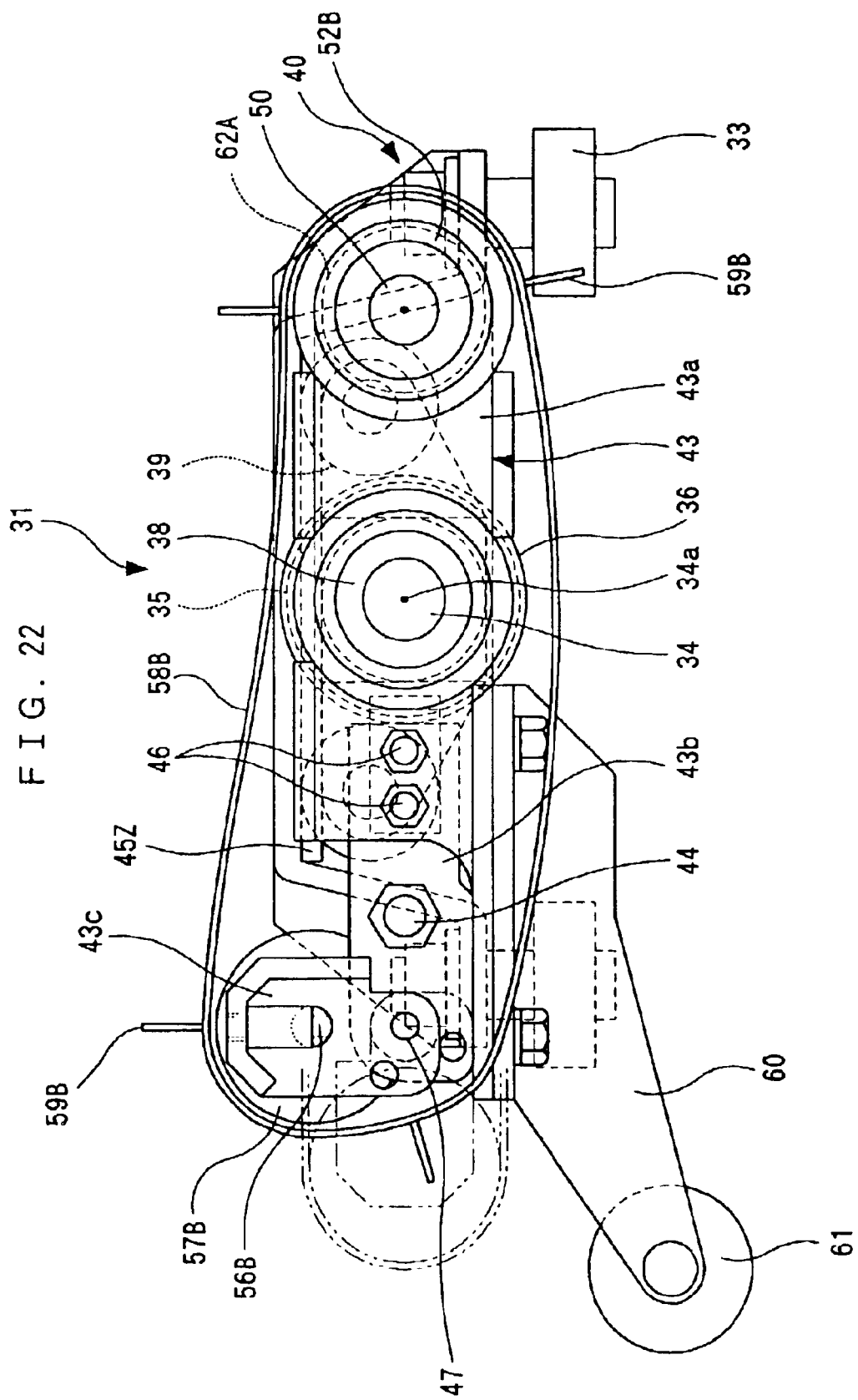
FIG. 22 is a side view showing the sorting conveyor in the sorting system wherein the endless turning bodies are loosened.
Figure 23:
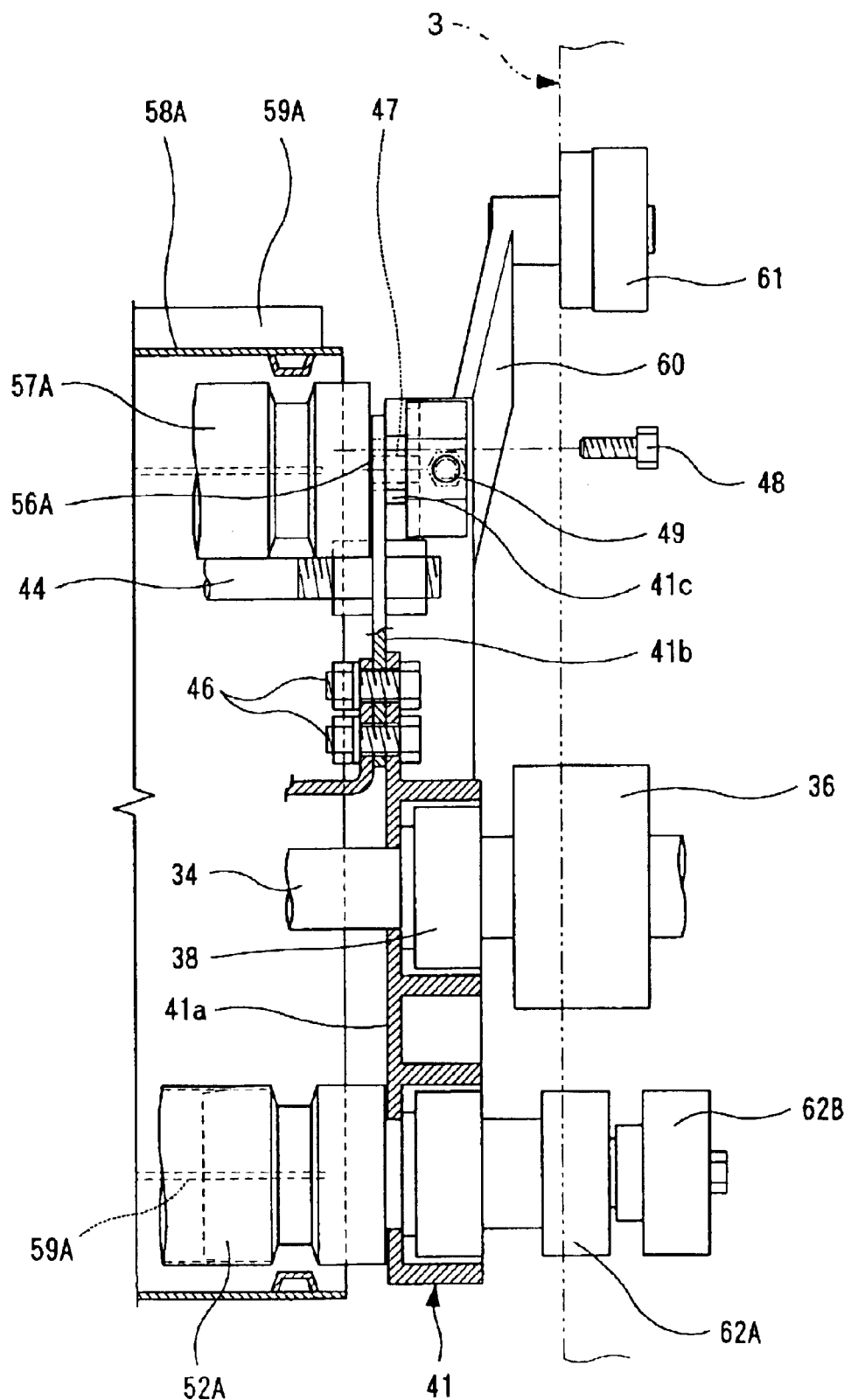
FIG. 23 is a partially cutaway plan view of the sorting conveyor in the sorting system wherein the endless turning bodies are loosened.

As the sorting system is used over time, the endless belts 58A and 58B may be damaged by the impact of receipt of loaded books or because of the frequency of sorting operations. In such a case, the endless belts are replaced with new ones. That is, as shown in FIGS. 22 and 23, the connectors 64 are removed to separate the side guides 63 from the sorting conveyor. Further, the position adjusting members 49 are removed (or loosened) as required. Then, the fixtures 48 are removed to sway the rear frame portions 41c, 42c, and 43c upward around the horizontal pin 47 relative to the intermediate frame portions 41b, 42b, and 43b. Thus, the rear frame portions 41c, 42c, and 43c are stood up.

In this position, the endless belts 58A and 58B can be loosened between the rear rollers 57A and 57B and the front rollers 52A and 52B. Accordingly, the endless belts 58A and 58B can be drawn out opposite to the frame body 3. Then, new endless belts 58A and 58B are externally fitted between the front rollers 52A and 52B and the rear rollers 57A and 57B, respectively, and the endless belts 58A and 58B are thus installed while being loosened.

Then, the rear frame portions 41c, 42c, and 43c are swayed downward around the horizontal pin 47 relative to the intermediate frame portions 41b, 42b, and 43b. Thus, the horizontal position is established where the rear frame portions 41c, 42c, and 43c are flush with the intermediate frame portions 41b, 42b, and 43b, respectively. Thereafter, the horizontal position is fixed on the basis of the fixing operation of the fixtures 48. Subsequently, the side guides 63 are installed, and the position adjusting members 49 are operated for adjustments.

Accordingly, the endless belts 58A and 58B can be promptly replaced with new ones, thereby reducing the time during which the sorting system must be shut down. Therefore, even if the sorting system cannot be easily shut down because it must be operated around the clock, the endless belts 58A and 58B can be easily replaced with new ones.

In the fourth embodiment, the rear rollers 57A and 57B can be moved between the position where the endless belts 58A and 58B are extended and the position where they are loosened. Alternatively, the front rollers 52A and 52B may be moved between the position where the endless belts 58A and 58B are stretched and the position where they are loosened, or both front rollers 52A and 52B and rear rollers 57A and 57B may be moved between the position where the endless belts 58A and 58B are stretched and the position where they are loosened.

In the fourth embodiment, the rear frame portions 41c, 42c, and 43c are swayed around the horizontal pin 47 to enable the rear rollers 57A and 57B to be arbitrarily moved between the position where the endless belts 58A and 58B are stretched and the position where they are loosened. Alternatively, the rear frame portions 41c, 42c, and 43c may be slid relative to the intermediate frame portions 41b, 42b, and 43b, respectively.

In the fourth embodiment, the pair of endless belts 58A and 58B are provided at the right and left sides of the sorting conveyor, respectively. However, one or two or more endless belts may be provided.

In each of the above described embodiments, the endless belts 58A and 58B as a whole have uniform quality. However, the endless belts 58A and 58B may be impregnated with resin and formed of a continuous member made of two low-flexibility belt portions located outside the crossbars 59A and 59B and wound around the front rollers 52A and 52B and the rear rollers 59A and 59B when rotation is stopped, and of the remaining two high-flexibility belt portions, these four portions being flush with one another. In this case, the two low-flexibility belt portions have a large number of holes of varying diameters.

In each of the above described embodiments, the books A are sorted. However, other articles or loads may be sorted. The shape of the receipt section 91 may vary depending on the type of sorted articles.

In each of the above described embodiments, as the endless turning bodies the endless belts 58A and 58B are employed. However, the endless turning bodies may be of various other forms such as chains, roller chains, or slat conveyors having a large number of strips.

In each of the above described embodiments, the front rollers (front wheels) 52A and 52B are provided with the friction wheels (passive wheels) 62A and 62B. However, the rear rollers (rear wheels) 57A and 57B may be provided with the friction wheels 62A and 62B.

In each of the above described embodiments, in the turning force applying means 81A and 81B, the friction wheels (passive wheels) 62A and 62B can be abutted against or separated from the friction rails 89A and 89B, respectively. However, racks may be meshed with pinions (passive wheels), or rails may be abutted against or separated from rollers (passive wheels) with the friction layers 62a, 62b, 89a, and 89b not employed.

In each of the above described embodiments, the endless belts 58A and 58B of the sorting conveyor 31 are inclined around the support shaft axis 34a so that the supply side at the rear end thereof lies below the other side. However, the end-less belts 58A and 58B may be inclined around the support shaft axis 34a so that the supply side at the front end thereof lies below the other side. In this case, the turning force applying means 81A and 81B are constructed so that the friction rails 89A and 89B can be abutted against or separated from the friction wheels 62A and 62B, respectively, from below.

In each of the above described embodiments, the group of receipt sections 91 are disposed below the conveying path 30. However, the books A fed by the endless belts 58A and 58B may be laterally taken out using a chute or a conveyor and then loaded into the housing box 92.

What is claimed is:

1. A sorting system comprising:

an endless driving body provided with a plurality of sorting conveyors to form an endless conveying path; and a group of receipt sections arranged to oppose the conveying path and receiving sorted articles from the sorting conveyors, wherein each of said sorting conveyors includes a group of front wheels and a group of rear wheels each extending in a transverse direction, and a plurality of endless turning bodies wound around wheels opposed to each other in a front-and-rear direction, each endless turning body being capable of individually turning along the conveying path;

each of the receipt sections is provided with turning force applying units for turning endless turning bodies of a target sorting conveyor; and the sorting conveyor includes passive wheels linked with one of the group of front wheels and the group of rear wheels, and the turning force applying units are movable toward or away from target passive wheels to be engageable therewith, so that the passive wheels are rotated by movement force exerted alone the conveying path of the sorting conveyor.

2. The sorting system according to claim 1, wherein the sorting conveyor has a front wheel shaft extending in the transverse direction and having one of the lateral pair of front wheels connected thereto, with the other front wheel being rotatably fitted over the sorting conveyor via a cylindrical shaft, and the turning force applying units are arranged to act individually on the front wheel shaft and the cylindrical shaft on one of the lateral sides of the sorting conveyor.

3. The sorting system according to claim 1, wherein the sorting conveyor includes a lateral pair of front wheel shafts, each shaft being connected to one of the wheels and provided with a passive wheel, and the turning force applying units are arranged at opposite lateral sides of the sorting conveyor, respectively, to individually act on the opposite passive wheels.

4. The sorting system according to claim 1, wherein the sorting conveyor has crossbars formed on the endless turning bodies and is mounted on the endless driving body side to be freely inclined around a horizontal axis lying at right angles to the conveying path, the sorting conveyor including guided bodies to receive sorted articles while the endless turning bodies lie in a horizontal direction and to reach the group of receipt sections while the endless turning bodies are inclined such that a supply side thereof on which the crossbars are located lies lower than the other side thereof, the sorting conveyor further including inclination-restricting guide members extended along the conveying path and guiding the guided bodies.

5. The sorting system according to claim 1, wherein the group of sorting conveyors are attached to a frame body in a cantilever manner.

6. The sorting system according to claim 1, wherein the group of sorting conveyors are attached to a frame body in a center impeller manner.

7. The sorting system according to claim 4, wherein the group of sorting conveyors are attached to the frame body in a center impeller manner, and the sorting conveyors are provided with guided bodies allocated on opposite lateral sides thereof and a pair of guide members along which the guided bodies are guided.

8. A sorting system comprising:
   an endless driving body provided with a plurality of sorting conveyors to form an endless conveying path; and
   a group of receipt sections arranged to oppose the conveying path and receiving sorted articles from the sorting conveyors,
   wherein each sorting conveyor comprises a front wheel, a rear wheel, and an endless turning bodies wound between both wheels and capable of freely turning in a direction of the conveying path, said sorting conveyor being supported and guided on a frame body in a cantilever manner, at least one of said wheels being movable between (a) a position where the endless turning bodies are stretched, and (b) a position where the endless turning bodies are loosened, thereby enabling the endless turning bodies to be drawn out opposite to the frame body.

9. The sorting system according to claim 8, wherein at least one of the wheels is rotatably supported by a swaying section provided in a conveyor frame, said swaying section being fixable to the conveyor frame when the wheel is at the position where the endless turning bodies are stretched.

10. The sorting system according to claim 8, wherein the front wheel is held in position and the rear wheel is held to be movable with respect to the conveyor frame, and a group of receipt sections for receiving sorted articles from the sorting conveyors are provided to oppose the conveying path, each of said receipt sections being provided with turning force applying units for turning the endless turning bodies of a target sorting conveyor, the turning force applying units being movable toward or away from passive wheels provided to the front wheel side, to be engageable therewith, so that the passive wheels are rotated by movement force exerted along the conveying path of the sorting conveyor.

11. The sorting system according to claim 8, wherein each sorting conveyor has a plurality of front wheels and rear wheels each extending in a transverse direction, and a plurality of endless turning bodies wound between wheels opposed to each other in a longitudinal direction and being individually turnable in the direction of the conveying path, and each receipt section is provided with turning force applying units for turning endless turning bodies of a target sorting conveyor.

12. The sorting system according to claim 8, wherein the sorting conveyor has crossbars formed on the endless turning bodies and is mounted on the endless driving body side to be freely inclined around a horizontal axis lying at right angles to the conveying path, the sorting conveyor including guided bodies to receive sorted articles while the endless turning bodies lie in a horizontal direction and to reach the group of receipt sections while the endless turning bodies are inclined such that a supply side thereof on which the crossbars are located lies lower than the other side thereof, the sorting conveyor further including inclination-restricting guide members extended along the conveying path and guiding the guided bodies.

13. A sorting system comprising:
   an endless driving body provided with a plurality of sorting conveyors to form an endless conveying path; and
   a group of receipt sections arranged to oppose the conveying path and receiving sorted articles from the sorting conveyors,
   wherein said sorting conveyers are mounted on the endless driving body to be freely inclined around a horizontal axis lying at a right angle to the conveying path,
   each of said sorting conveyors includes a group of front wheels and a group of rear wheels each extending in a transverse direction, and a plurality of endless turning bodies wound around wheels opposed to each other in a front-and-rear direction, each endless turning body being capable of individually turning along the conveying path, and
   each of the receipt sections is provided with turning force applying units for turning endless turning bodies of a target sorting conveyor.

* * * * *